United States Patent
Parker et al.

(10) Patent No.: US 10,936,504 B2
(45) Date of Patent: Mar. 2, 2021

(54) APPARATUS AND METHOD FOR ADDRESS TRANSLATION AND CONTROL OF WHETHER AN ACCESS REQUEST IS REJECTED BASED ON AN OWNERSHIP TABLE INDICATING AN OWNER PROCESS FOR A BLOCK OF PHYSICAL ADDRESSES

(71) Applicant: ARM Limited, Cambridge (GB)

(72) Inventors: Jason Parker, Sheffield (GB); Richard Roy Grisenthwaite, Cambridge (GB); Andrew Christopher Rose, Great Shelford (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/579,665

(22) PCT Filed: Apr. 28, 2016

(86) PCT No.: PCT/GB2016/051199
§ 371 (c)(1),
(2) Date: Dec. 5, 2017

(87) PCT Pub. No.: WO2016/203192
PCT Pub. Date: Dec. 22, 2016

(65) Prior Publication Data
US 2018/0173641 A1 Jun. 21, 2018

(30) Foreign Application Priority Data
Jun. 16, 2015 (GB) ..................... 1510527

(51) Int. Cl.
*G06F 12/10* (2016.01)
*G06F 12/1009* (2016.01)
(Continued)

(52) U.S. Cl.
CPC .......... *G06F 12/1009* (2013.01); *G06F 9/468* (2013.01); *G06F 12/1036* (2013.01);
(Continued)

(58) Field of Classification Search
CPC ............... G06F 12/109; G06F 12/1036; G06F 12/1491; G06F 21/72; G06F 12/1009;
(Continued)

(56) References Cited

U.S. PATENT DOCUMENTS 5,754,762 A 5/1998 Kuo et al.
5,978,910 A 11/1999 Slavenburg
(Continued)

FOREIGN PATENT DOCUMENTS

CN 102084330 6/2011
CN 102460376 5/2012
(Continued)

OTHER PUBLICATIONS

U.S. Appl. No. 15/574,549, filed Nov. 16, 2017, Inventor: Parker et al.
(Continued)

*Primary Examiner* — Pierre Miche Bataille
(74) *Attorney, Agent, or Firm* — Nixon & Vanderhye P.C.

(57) ABSTRACT

A data processing apparatus (20) comprises address translation circuitry (40) to translate a first address into a physical address directly identifying a corresponding location in a data store, and a table (50) comprising one or more entries indexed by the physical address, wherein at least one of the entries specifies the first address from which the corresponding physical address was translated by the address translation circuitry (40).

18 Claims, 16 Drawing Sheets

(51) Int. Cl.
*G06F 9/46* (2006.01)
*G06F 21/72* (2013.01)
*G06F 21/78* (2013.01)
*G06F 12/1036* (2016.01)
*G06F 12/14* (2006.01)
*G06F 12/1018* (2016.01)

(52) U.S. Cl.
CPC .......... *G06F 12/1491* (2013.01); *G06F 21/72* (2013.01); *G06F 21/78* (2013.01); *G06F 12/1018* (2013.01); *G06F 12/1458* (2013.01); *G06F 2212/1044* (2013.01); *G06F 2212/1052* (2013.01); *G06F 2212/151* (2013.01); *G06F 2212/651* (2013.01); *G06F 2212/657* (2013.01); *G06F 2212/681* (2013.01)

(58) Field of Classification Search
CPC .... G06F 21/78; G06F 9/468; G06F 2212/651; G06F 12/1018; G06F 2212/1052; G06F 2212/1044; G06F 2212/681; G06F 2212/657; G06F 2212/151; G06F 12/1458
See application file for complete search history.

(56) References Cited

U.S. PATENT DOCUMENTS

| | | | |
|---|---|---|---|
| 6,085,296 A | 7/2000 | Karkhanis | |
| 6,564,302 B1 | 5/2003 | Yagi et al. | |
| 6,789,156 B1 | 9/2004 | Waldspurger | |
| 6,854,039 B1 | 2/2005 | Strongin et al. | |
| 6,886,085 B1 | 4/2005 | Shuf | |
| 7,278,030 B1 | 10/2007 | Chen et al. | |
| 7,334,076 B2 | 2/2008 | Hendel et al. | |
| 7,702,743 B1 | 4/2010 | Wong | |
| 7,856,536 B2 | 12/2010 | Bergheaud | |
| 8,195,912 B2 | 6/2012 | Flynn et al. | |
| 8,874,883 B2 | 10/2014 | Williams et al. | |
| 9,330,018 B2 * | 5/2016 | Deutschle | G06F 12/1027 |
| 2003/0084256 A1 * | 5/2003 | McKee | G06F 12/1475 |
| | | | 711/152 |
| 2005/0172138 A1 | 8/2005 | Ezzat | |
| 2005/0172294 A1 | 8/2005 | Kanemura et al. | |
| 2005/0216696 A1 | 9/2005 | Kawaguchi | |
| 2005/0223220 A1 | 10/2005 | Campbell et al. | |
| 2006/0026383 A1 * | 2/2006 | Dinechin | G06F 12/1036 |
| | | | 711/207 |
| 2006/0206658 A1 | 9/2006 | Hendel et al. | |
| 2006/0294288 A1 | 12/2006 | Seth et al. | |
| 2006/0294519 A1 | 12/2006 | Hattori et al. | |
| 2007/0103476 A1 | 5/2007 | Huang | |
| 2007/0136576 A1 * | 6/2007 | Chambers | G06F 21/78 |
| | | | 713/164 |
| 2008/0109625 A1 | 5/2008 | Erlingsson | |
| 2008/0147956 A1 | 6/2008 | Rawson | |
| 2008/0184373 A1 | 7/2008 | Traut | |
| 2008/0215826 A1 | 9/2008 | Markova et al. | |
| 2008/0313417 A1 | 12/2008 | Kim | |
| 2009/0150641 A1 | 6/2009 | Flynn et al. | |
| 2009/0157965 A1 | 6/2009 | Shum et al. | |
| 2009/0327575 A1 | 12/2009 | Durham et al. | |
| 2011/0010483 A1 | 1/2011 | Liljeberg | |
| 2011/0093750 A1 | 4/2011 | Williams | |
| 2011/0231614 A1 | 9/2011 | Spracklen | |
| 2011/0289294 A1 | 11/2011 | Maeda | |
| 2011/0314224 A1 | 12/2011 | Piry | |
| 2012/0017029 A1 | 1/2012 | Santos et al. | |
| 2012/0068957 A1 | 3/2012 | Puskarich | |
| 2012/0079254 A1 | 3/2012 | Williams | |
| 2012/0079458 A1 | 3/2012 | Williams et al. | |
| 2012/0131259 A1 | 5/2012 | Baskakov | |
| 2012/0226849 A1 | 9/2012 | Saito | |
| 2012/0233396 A1 | 9/2012 | Flynn et al. | |
| 2012/0297043 A1 | 11/2012 | Davis | |
| 2012/0331465 A1 | 12/2012 | Tanikawa | |
| 2013/0070515 A1 | 3/2013 | Mayhew | |
| 2013/0097392 A1 | 4/2013 | Arges et al. | |
| 2013/0159661 A1 | 6/2013 | Trimmer et al. | |
| 2013/0185532 A1 * | 7/2013 | Flynn | G06F 3/061 |
| | | | 711/162 |
| 2013/0318058 A1 | 11/2013 | Fries et al. | |
| 2014/0041033 A1 * | 2/2014 | Durham | G06F 12/1458 |
| | | | 726/23 |
| 2014/0058871 A1 | 2/2014 | Marr | |
| 2014/0173600 A1 | 6/2014 | Ramakrishnan Nair | |
| 2014/0230077 A1 | 8/2014 | Muff et al. | |
| 2014/0297964 A1 | 10/2014 | Nakase | |
| 2015/0006795 A1 | 1/2015 | Becker et al. | |
| 2015/0268985 A1 | 9/2015 | Jokinen | |
| 2016/0004646 A1 * | 1/2016 | Maeda | G06F 12/0238 |
| | | | 713/193 |
| 2016/0148001 A1 | 5/2016 | Bacher | |
| 2016/0267013 A1 | 9/2016 | Van De Ven | |
| 2016/0283663 A1 | 9/2016 | Allen | |
| 2016/0321186 A1 * | 11/2016 | Deutschle | G06F 12/1027 |

FOREIGN PATENT DOCUMENTS

| | | |
|---|---|---|
| CN | 104391678 | 3/2015 |
| EP | 0 743 601 | 11/1996 |
| EP | 2 660 752 | 11/2013 |
| GB | 2483907 | 3/2012 |
| JP | H05-257811 | 10/1993 |
| JP | 2000-276405 | 10/2000 |
| JP | 2006-252554 | 9/2006 |
| JP | 2007-280421 | 10/2007 |
| JP | 2009-064462 | 3/2009 |
| JP | 2011-518380 | 6/2011 |
| JP | 2013-232151 | 11/2013 |
| JP | 2013-542498 | 11/2013 |
| JP | 2014-532201 | 12/2014 |
| TW | 200530816 | 9/2005 |
| TW | 201339835 | 10/2013 |
| TW | 201346549 | 11/2013 |
| TW | 201502780 | 1/2015 |
| TW | 201514850 | 4/2015 |
| WO | WO 2007/109145 | 9/2007 |
| WO | WO 2013/054528 | 4/2013 |
| WO | WO 2014/122415 | 8/2014 |
| WO | 2014/155666 | 10/2014 |
| WO | 2014/184515 | 11/2014 |

OTHER PUBLICATIONS

U.S. Appl. No. 15/574,596, filed Nov. 16, 2017, Inventor: Parker et al.
U.S. Appl. No. 15/574,938, filed Nov. 17, 2017, Inventor: Parker et al.
U.S. Appl. No. 15/578,340, filed Nov. 30, 2017, Inventor: Parker et al.
International Search Report and Written Opinion of the ISA for PCT/GB2016/051168, dated Aug. 8, 2016, 10 pages.
Combined Search and Examination Report for GB 1510533.1, dated Jan. 15, 2016, 6 pages.
International Search Report and Written Opinion of the ISA for PCT/GB2016/051198, dated Jul. 22, 2016, 12 pages.
Combined Search and Examination Report for GB 1510526.5, dated Dec. 23, 2015, 8 pages.
International Search Report and Written Opinion of the ISA for PCT/GB2016/051167, dated Jun. 28, 2016, 14 pages.
Combined Search and Examination Report for GB 1510534.9, dated Jan. 12, 2016 , 7 pages.
International Search Report and Written Opinion of the ISA for PCT/GB2016/051166, dated Aug. 1, 2016, 11 pages.
Combined Search and Examination Report for GB 1510531.5, dated Jan. 20, 2016 , 8 pages.
Witchel et al., "Hardware Works, Software Doesn't: Enforcing Modularity with Mondriaan Memory Protection", Workshop on Hot Topics in Operating Systems, May 18, 2003, pp. 139-144.

(56) References Cited

OTHER PUBLICATIONS

Examination Report for GB 1510534.9 dated Jan. 12, 2018, 4 pages.
S. Jin et al, Secure MMU: Architectural Support for Memory Isolation among Virtual Machines, IEEE, Jun. 2011, pp. 217-222.
J. Elwell et al, "A Non-Inclusive Memory Permissions Architecture for Protection Against Cross-Layer Attacks" Feb. 2014, 12 pages.
F. Zhang et al, "CloudVisor: Retrofitting Protection of Virtual Machines in Multi-tenant Cloud with Nested Virtualization" *SOSP '11*, Oct. 23-26, 2011, pp. 203-216.
J. Szefer et al, "Architectural Support for Hypervisor-Secure Virtualization" *ASPLOS'12*, Mar. 3-7, 2012, pp. 437-449.
International Search Report and Written Opinion of the ISA for PCT/GB2016/051199 dated Aug. 17, 2016, 11 pages.
Combined Search and Examination Report for GB 1510527.3 dated Dec. 21, 2015, 5 pages.
Office Action dated Jan. 10, 2019 in co-pending U.S. Appl. No. 15/574,549, 40 pages.
Office Action dated Oct. 17, 2018 in co-pending U.S. Appl. No. 15/574,938, 20 pages.
Dubrulle et al, "Secure data processing: Blind Hypervision," CEA tech, Jan. 2013, downloaded from https://www.artemis-emc2.eu/fileadmin/user_upload/Publications/2015_Systematic_Paris/CEALISTDACLE_MPU_Based_Blind_Virtualisation_v4.pdf on Jan. 4, 2019, 21 pages.
Dubrulle et al, "Blind Hypervision to Protect Virtual Machine Privacy Against Hypervisor Escape Vulnerabilities," IEEE 13th International Conference on Industrial Informatics (INDIN), Jul. 2015, 6 pages.
"ARM Security Technology: Building a Secure System using Trustzone® Technology," White Paper, ARM Limited, © 2005-2009, 108 pages.
Examination Report dated Jun. 20, 2017 in GB Application No. 1510531.5, 6 pages.
Final Office Action dated Apr. 23, 2019 in co-pending U.S. Appl. No. 15/574,938, 16 pages.
Office Action dated May 9, 2019 in co-pending U.S. Appl. No. 15/578,340 23 pages.
Final Office Action dated Jul. 30, 2019 in co-pending U.S. Appl. No. 15/574,549, 31 pages.
Office Action for EP Application No. 16720485.8 dated Jun. 24, 2019, 7 pages.
Office Action dated Feb. 13, 2020 in co-pending U.S. Appl. No. 15/578,340 23 pages.
Office Action for JP Application No. 2017-564105 dated Feb. 4, 2020, 5 pages.
Office Action dated Dec. 2, 2019 in co-pending U.S. Appl. No. 15/574,549, 24 pages.
Office Action dated Dec. 2, 2019 in co-pending U.S. Appl. No. 15/574,596, 49 pages.
Jin et al, "H-SVM: Hardware-Assisted Secure Virtual Machines under a Vulnerable Hypervisor," IEEE Transactions on Computers, vol. 64, No. 10, Oct. 2015 (listing a "Date of publication Jan. 8, 2015" for manuscript), pp. 2833-2846.
Jin et al, "Architectural Support for Secure Virtualization under a Vulnerable Hypervisor," 44th Annual IEEE/ACM International Symposium on Microarchitecture (MICRO-44), Dec. 3-7, 2011, Porto Alegre, Brazil, 12 pages.
Office Action for EP Application No. 16720504.6 dated Jan. 8, 2020, 8 pages.
Final Office Action dated Oct. 9, 2019 in co-pending U.S. Appl. No. 15/578,340 21 pages.
Office Action for TW Application 105114881 dated May 14, 2020 and English translation, 17 pages.
English translation for Office Action for JP Application No. 2017-564105 dated Feb. 4, 2020, 4 pages.
Office Action for JP Application No. 2017-564099 dated Mar. 3, 2020 and English translation, 6 pages.
Office Action for TW Application No. 105114821 dated Jan. 20, 2020 and English translation, 20 pages.
Office Action for JP Application No. 2017-564090 dated Mar. 5, 2020 and English translation, 8 pages.
Office Action for JP Application 2017-564103 dated Mar. 6, 2020 and English translation, 12 pages.
Search Report and Office Action for TW Application No. 105114807 dated Apr. 23, 2020, 13 pages.
English translation of Office Action for TW Application No. 105114807 dated Apr. 23, 2020, 8 pages.
Office Action for EP Application No. 16720487.4 dated May 28, 2020, 6 pages.
Office Action for GB Application No. 1510526.5 dated May 15, 2020, 4 pages.

* cited by examiner

Shared Access Control

Exclusive Sharing Control to Owner

Process Descriptor Entry

Process Status States (Lifecycle)

APPARATUS AND METHOD FOR ADDRESS TRANSLATION AND CONTROL OF WHETHER AN ACCESS REQUEST IS REJECTED BASED ON AN OWNERSHIP TABLE INDICATING AN OWNER PROCESS FOR A BLOCK OF PHYSICAL ADDRESSES

This application is the U.S. national phase of International Application No. PCT/GB2016/051199 filed Apr. 28, 2016, which designated the U.S. and claims priority to GB Patent Application No. 1510527.3 filed Jun. 16, 2015, the entire contents of each of which are hereby incorporated by reference.

The present technique relates to the field of data processing. More particularly, it relates to data processing apparatuses and methods supporting address translation.

A data processing apparatus may have address translation circuitry for translating a first address into a physical address which directly identifies a corresponding location in a data store.

At least some examples provide a data processing apparatus comprising:

address translation circuitry to translate a first address into a physical address directly identifying a corresponding location in a data store; and a table comprising one or more entries indexed by the physical address, wherein at least one of said entries identifies a first address from which the corresponding physical address was translated by the address translation circuitry.

At least some examples provide a data processing apparatus comprising:

means for translating a first address into a physical address directly identifying a corresponding location in a data store; and means for storing one or more entries indexed by the physical address, wherein at least some of said entries specify the first address from which the corresponding physical address was translated by the means for translating.

At least some examples provide a data processing method comprising:

in response to an access request specifying a target first address, translating the target first address into a target physical address directly identifying a corresponding location in a data store;

accessing a table comprising one or more entries each corresponding to a physical address and identifying a first address from which the corresponding physical address was translated by the address translation circuitry; and determining whether there is a mismatch between the target first address specified by the access request and the first address specified in the entry of the table corresponding to the target physical address.

Further aspects, features and advantages of the present technique will be apparent from the following description of examples, which is to be read in conjunction with the accompanying drawings, in which:

FIG. 1 schematically illustrates an example of processes executed by a processing apparatus;

FIG. 2 shows an example of a data processing apparatus;

FIG. 3 schematically illustrates an example of validation of access requests to access data in a data store;

Figure 10:
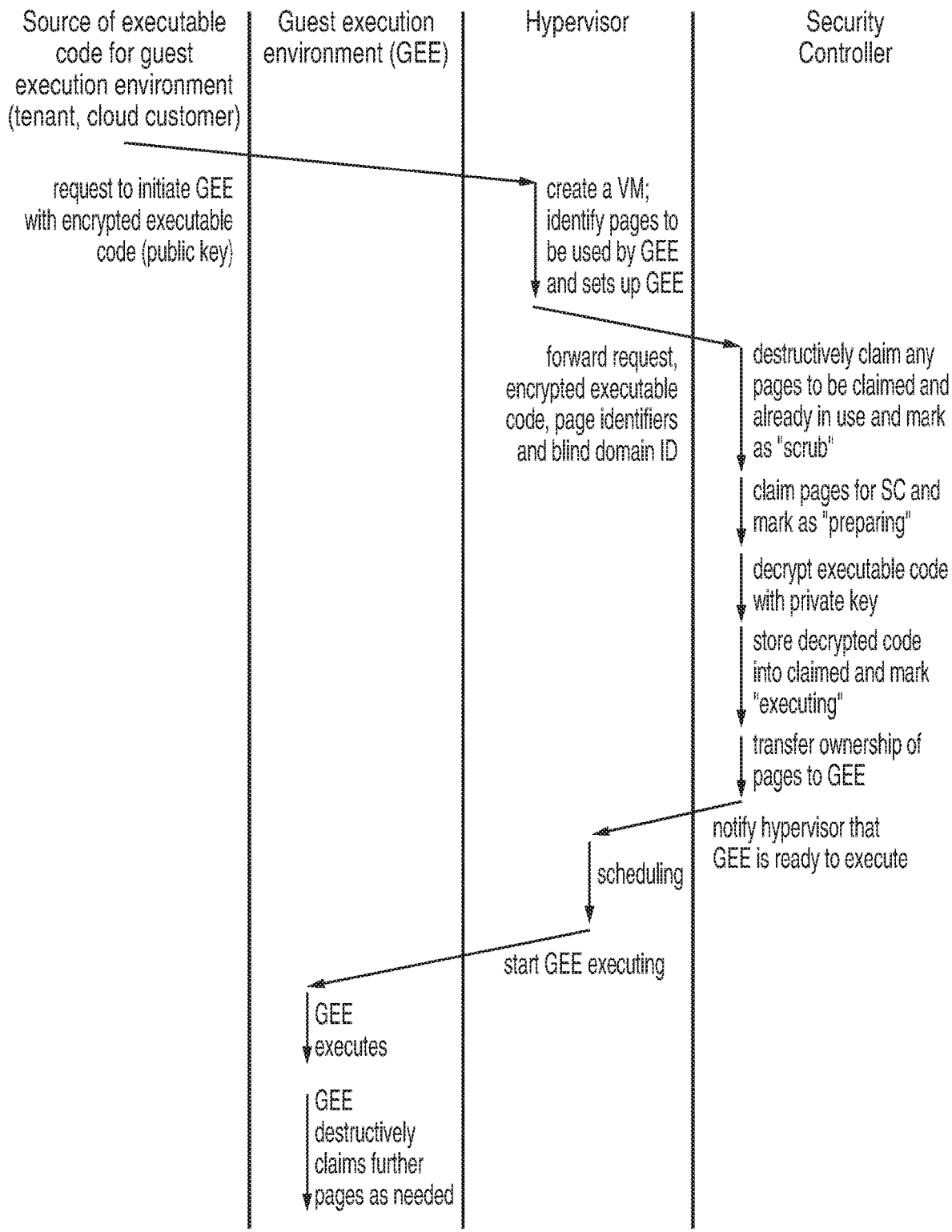
Figure 11:
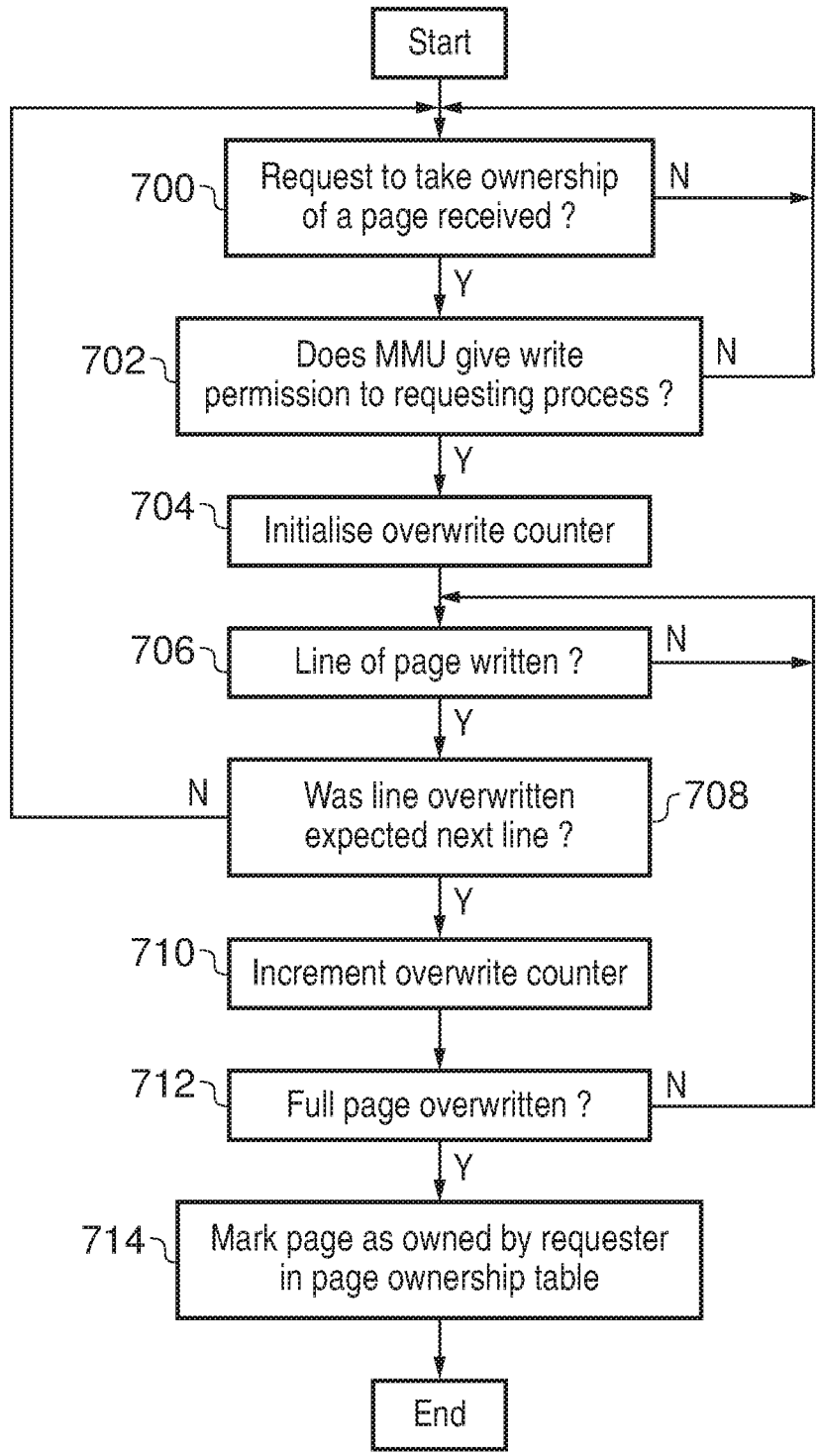
Figure 12:
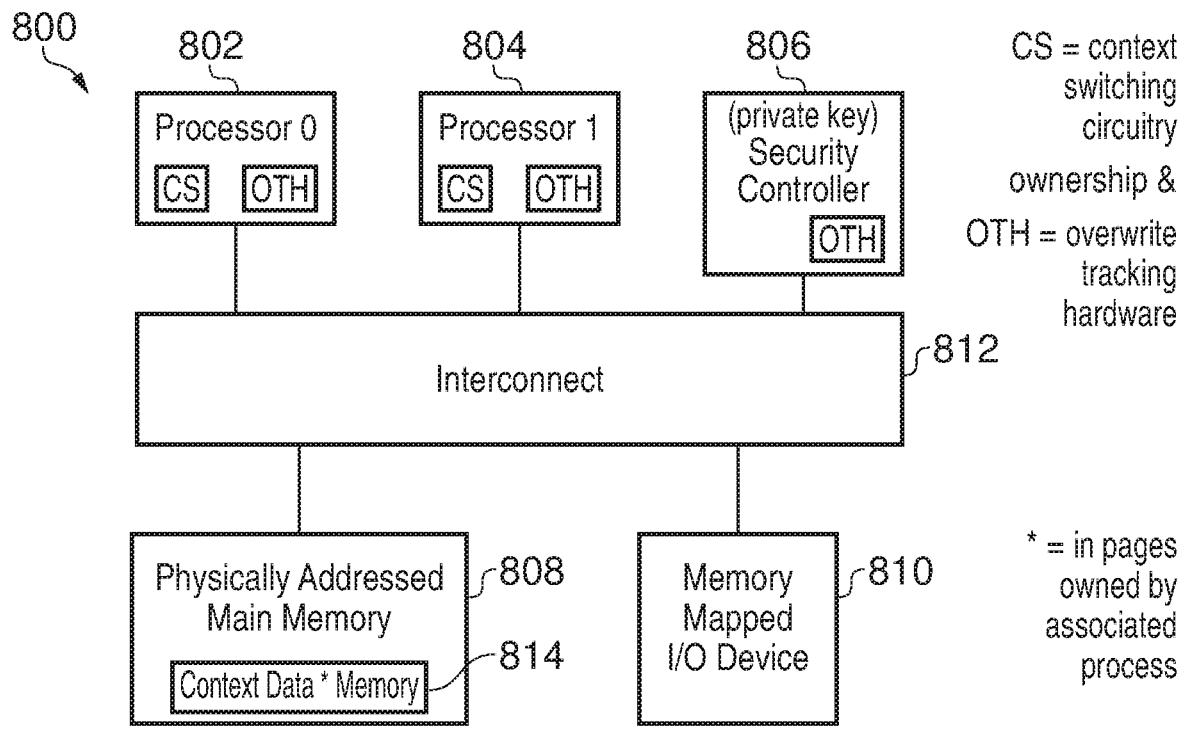
Figure 13:
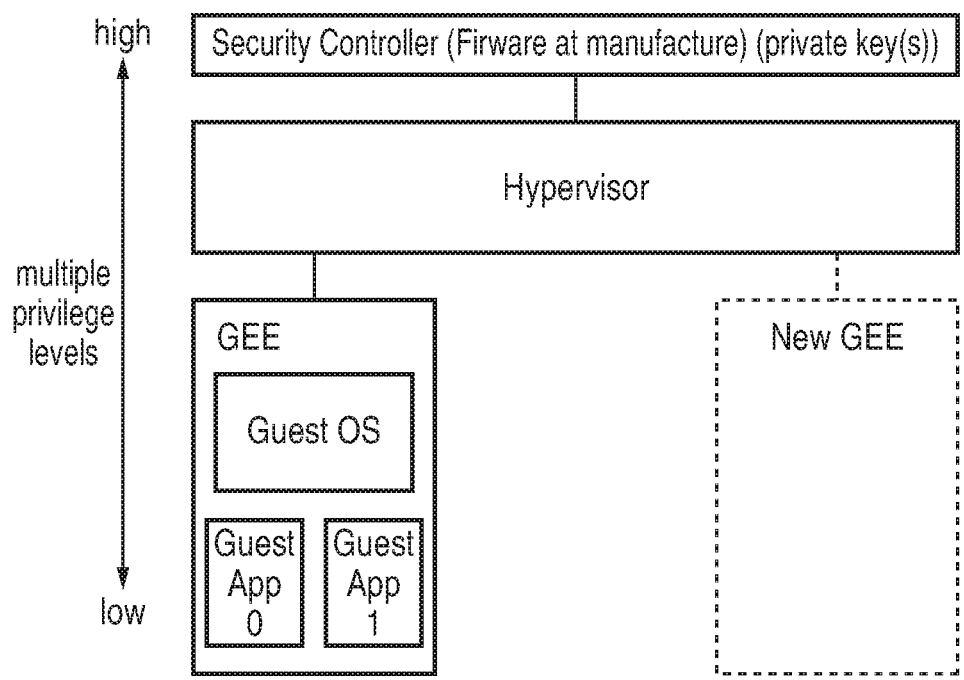
Figure 14:
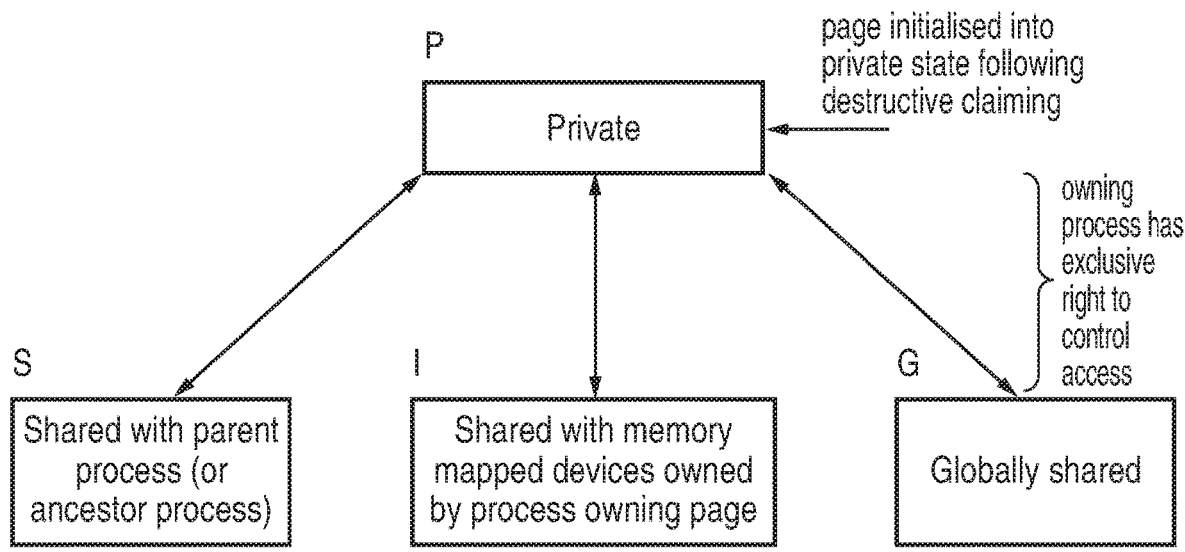
Figure 15:
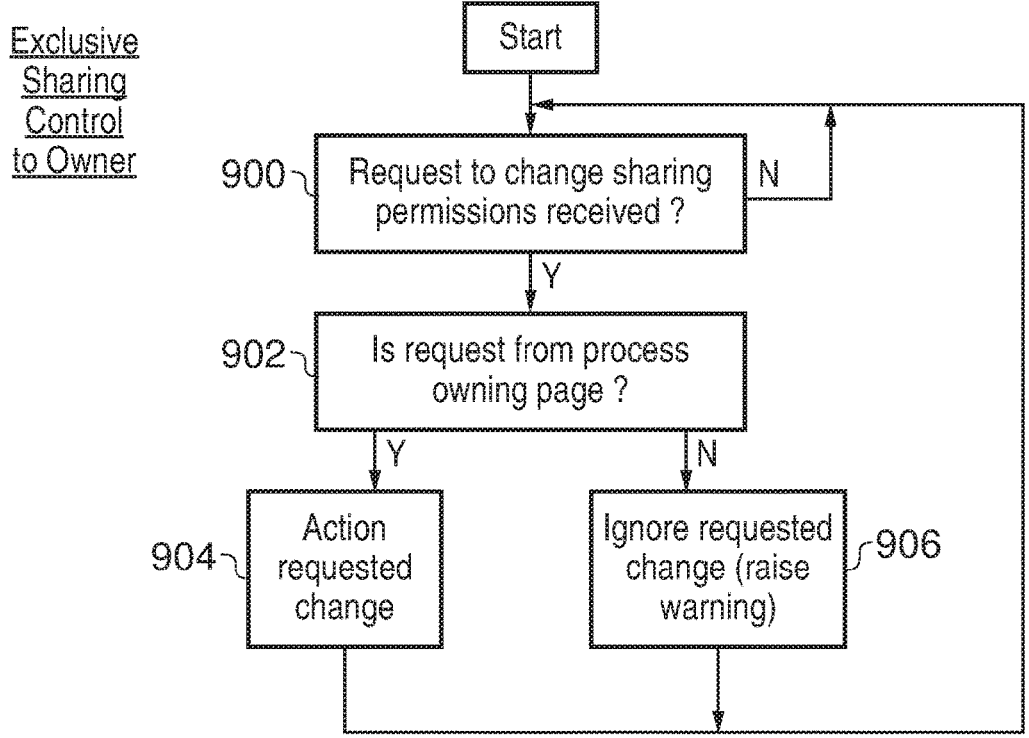
Figure 16A:
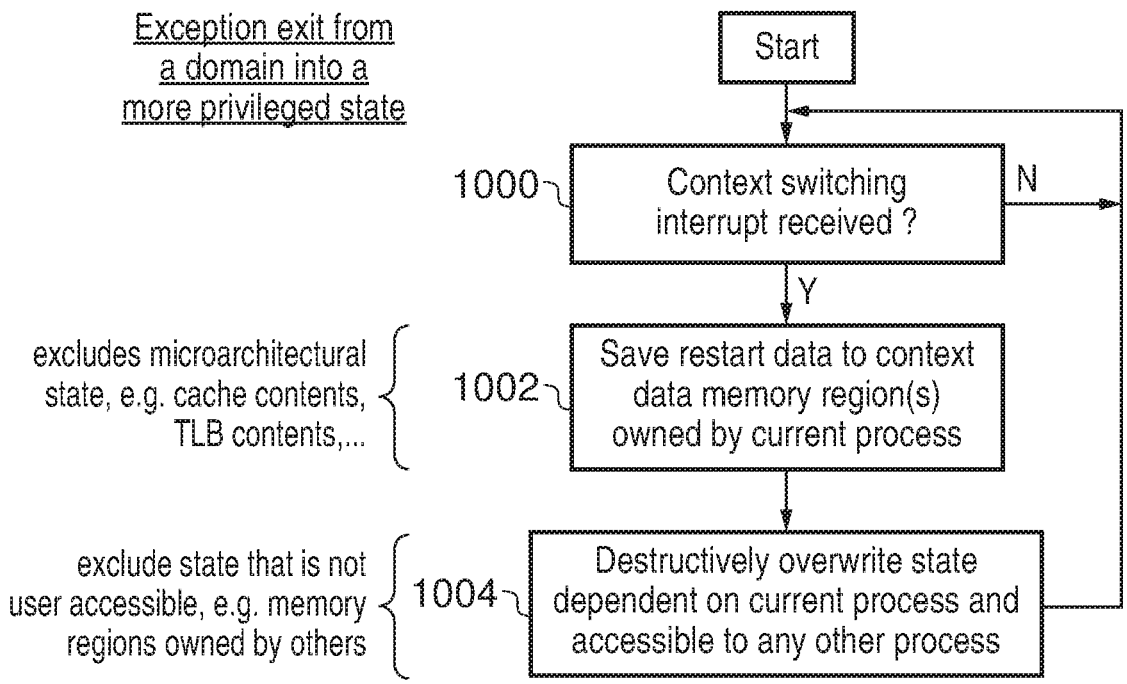
Figure 16B:
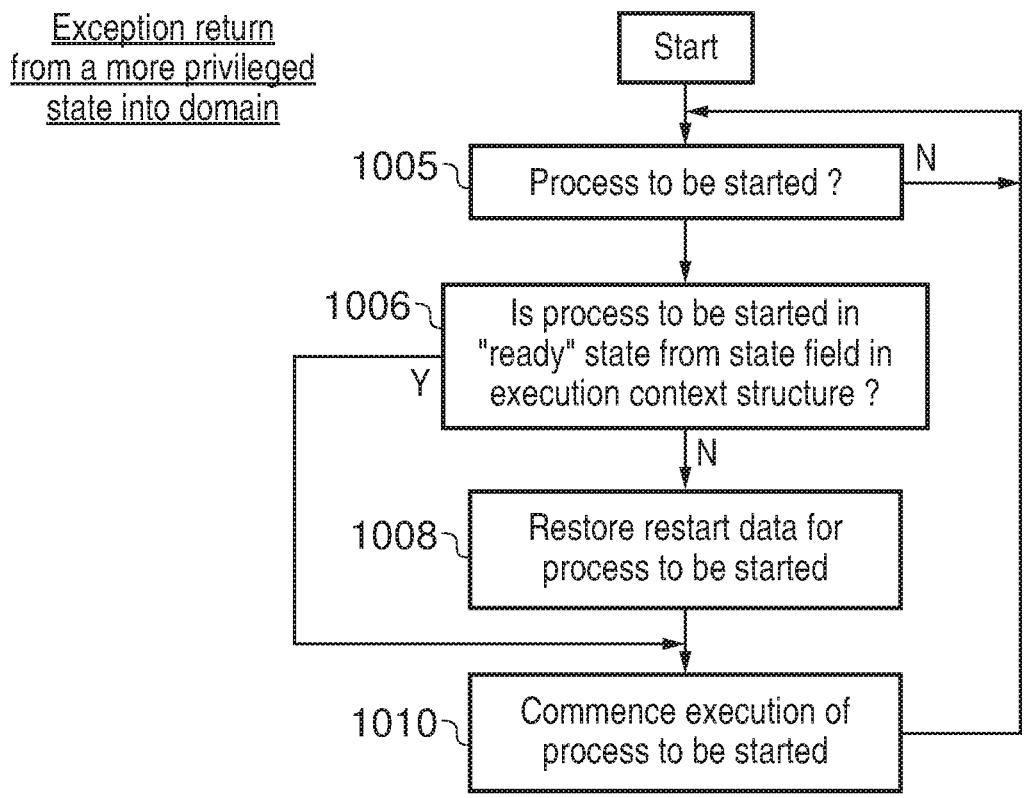
Figure 17:
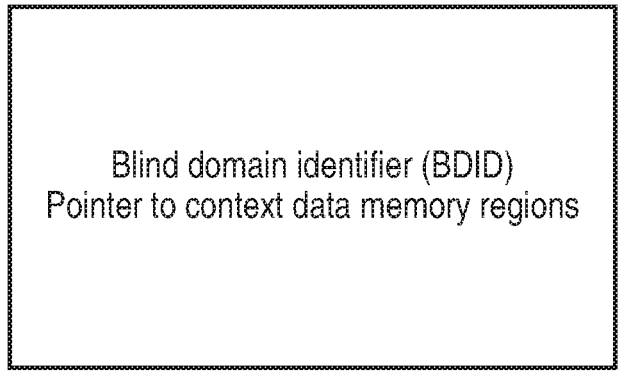

FIG. 10 schematically illustrates secure initialization of a guest execution environment;

FIG. 11 is a flow diagram schematically illustrating a process of destructively claiming ownership of a page of physical memory address space;

FIG. 12 schematically illustrates a hardware system for supporting a hypervisor and multiple guest execution environments;

FIG. 13 schematically illustrates the relationship between a hypervisor, a security controller and multiple guest execution environments;

FIG. 14 schematically illustrates various sharing states of a page of physical memory address space;

FIG. 15 is a flow diagram schematically illustrating handling of a request to change sharing permissions;

FIGS. 16A and 16B are a flow diagrams schematically illustrating a switch of execution context;

FIG. 17 schematically illustrates an example process descriptor entry; and

Figure 18:
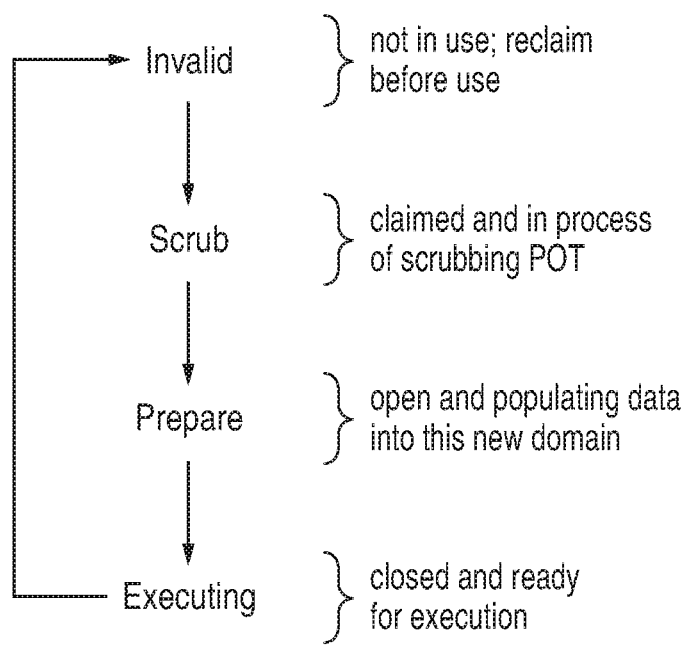

FIG. 18 schematically illustrates process status states.

Some specific examples of the present technique are discussed below.

Figure 1:
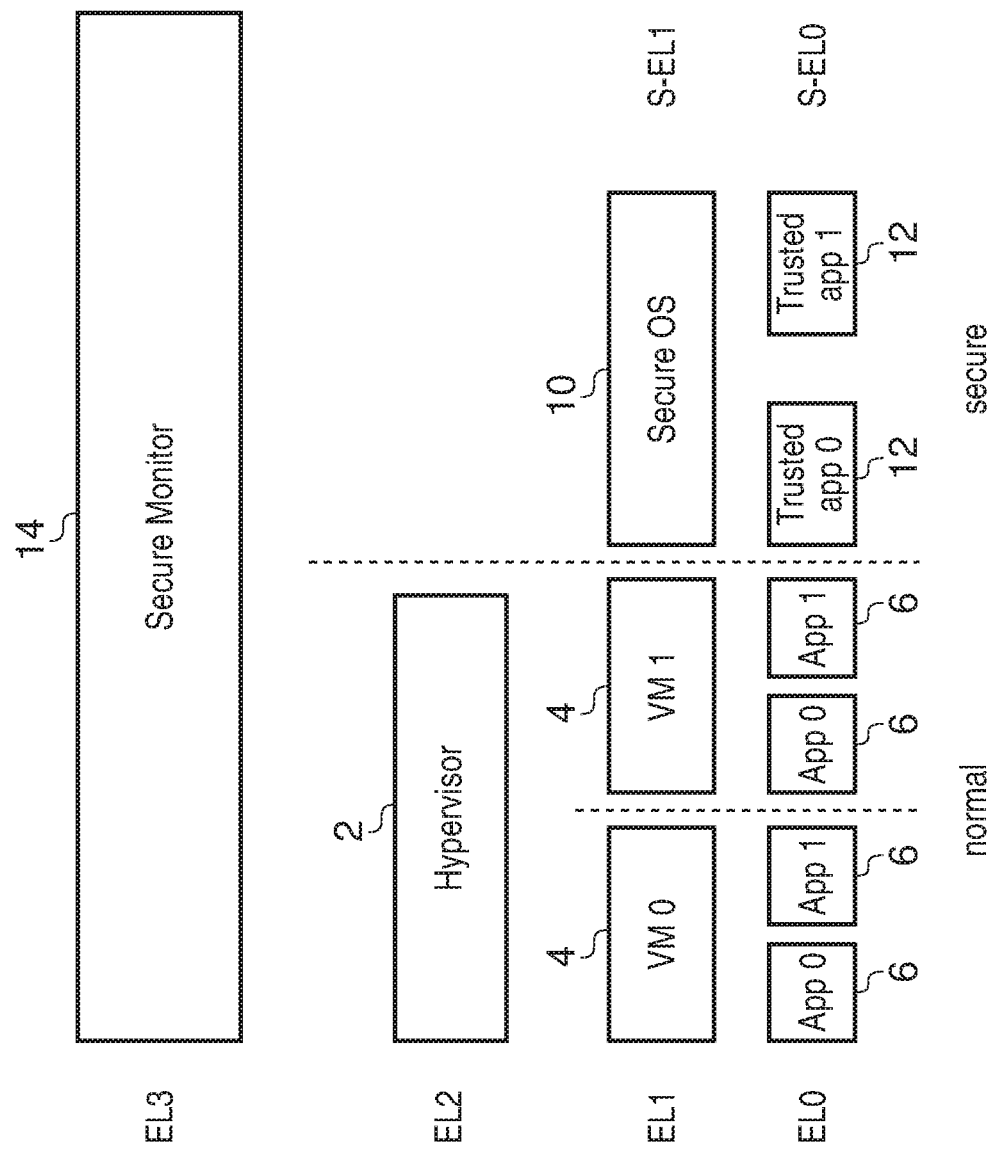

FIG. 1 schematically illustrates an example of processes which can be executed by a data processing apparatus. A hypervisor 2 may manage a number of virtual machines (VMs, also known as guest operating systems or guest OS) 4. Each VM 4 may manage one or more applications 6. For example the hypervisor 2 may control which regions of an address space are allocated to each virtual machine 4 and control switching between the virtual machines 4, e.g. scheduling interrupts to time share processing resource between the respective virtual machines 4. Similarly, each VM 4 may control which regions of the address space are allocated to each application 6 executing under that VM 4, and may control switching between the applications as required.

As shown in FIG. 1, each process is associated with a given privilege level EL0, EL1, EL2, EL3. In this example higher numbered privilege levels are more privileged than lower numbered privilege levels, although it could be numbered the other way round in other examples. In this example, the applications 6 execute at privilege level EL0, the VMs 4 execute at privilege level EL1 and the hypervisor 2 executes at privilege level EL2. Typically, a process executing at a higher privilege level has rights not available to a process executing at a lower privilege level.

As shown in FIG. 1, the hypervisor 2, VMs 4 and apparatus 6 may operate in a normal domain. In addition, the apparatus may support a secure domain which is partitioned from the normal domain so that processes executing in the normal domain cannot access data or instructions associated with the secure domain. Hence, there may also be processes running in the secure domain, such as a secure operating system (OS) 10 and trusted applications 12 executing in the secure domain under control of the secure OS 10. The secure OS 10 and trusted applications 12 execute at privilege levels S-EL1, S-EL0 respectively. A secure monitor process 14 is also provided at privilege level EL3 to manage transitions between the normal domain and the secure domain. The secure monitor process 14 may for example manage which regions of the address space are associated with the secure or non-secure domains, with some protection hardware being provided to prevent non-secure processes in the normal domain accessing data or instructions within the secure regions. An example of a technique for partitioning the normal and secure domains is the Trustzone® technique provided by ARM® Limited of Cambridge, UK, although other examples could also be used. The provision of a secure domain as shown in FIG. 1 is optional and other embodiments may not support the secure monitor 14, secure OS 10 and trusted applications 12 for example.

The processes 2, 4, 6, 10, 12, 14 each use virtual addresses (VAs) to identify locations to be accessed in a data store such as memory. The VAs are translated into physical addresses (PAs) directly identifying corresponding storage locations. For an application 6 or a virtual machine 4, the VAs are first translated into intermediate physical addresses (IPAs), and then the IPAs are translated into PAs. By providing two levels of address translation, the virtual machine 4 may control page tables for the VA to IPA translation to control which portions of the address space are allocated to each application 6, and the hypervisor 2 may control page tables for the IPA to PA translation to control which portions of the address space are allocated to each virtual machine 4, for example. For the other processes 2, 14, 10, 12 the VAs are translated directly into PAs with the hypervisor 2 (in the normal domain) or the secure OS 10 (in the secure domain) for example controlling the page tables which control which portions of the address space each process can access.

Hence, there may be a number of processes which can be executed by a data processing apparatus. In typical systems, control over access to the address space is managed in a "top down" manner with processes at higher privilege levels controlling what addresses can be accessed by processes at lower privilege levels. For example, the hypervisor 2 at EL2 sets access permissions defining which addresses can be accessed by the virtual machines 4 at EL1. However, typically the process running at the higher privilege level can read or write to all the addresses associated with each process running under it at lower privilege levels. This can cause security issues for developers of processes operating at lower privilege levels. For example, in a cloud platform which implements a number of virtual machines 4 provided by different parties, one of the parties may wish to prevent data or code associated with the virtual machine 4 being exposed to the hypervisor 2, which may be provided by a different party such as the cloud operator.

The present application introduces the concept of a "blind hypervisor" which still manages the virtual machines 4 and controls which portions of the address space they can access, but which cannot necessarily see all the data associated with a given virtual machine 4. Similarly, for processes operating at other privilege levels, a process running at a higher privilege level can be prevented from accessing addresses which are used by a process running at a lower privilege level.

Figure 2:
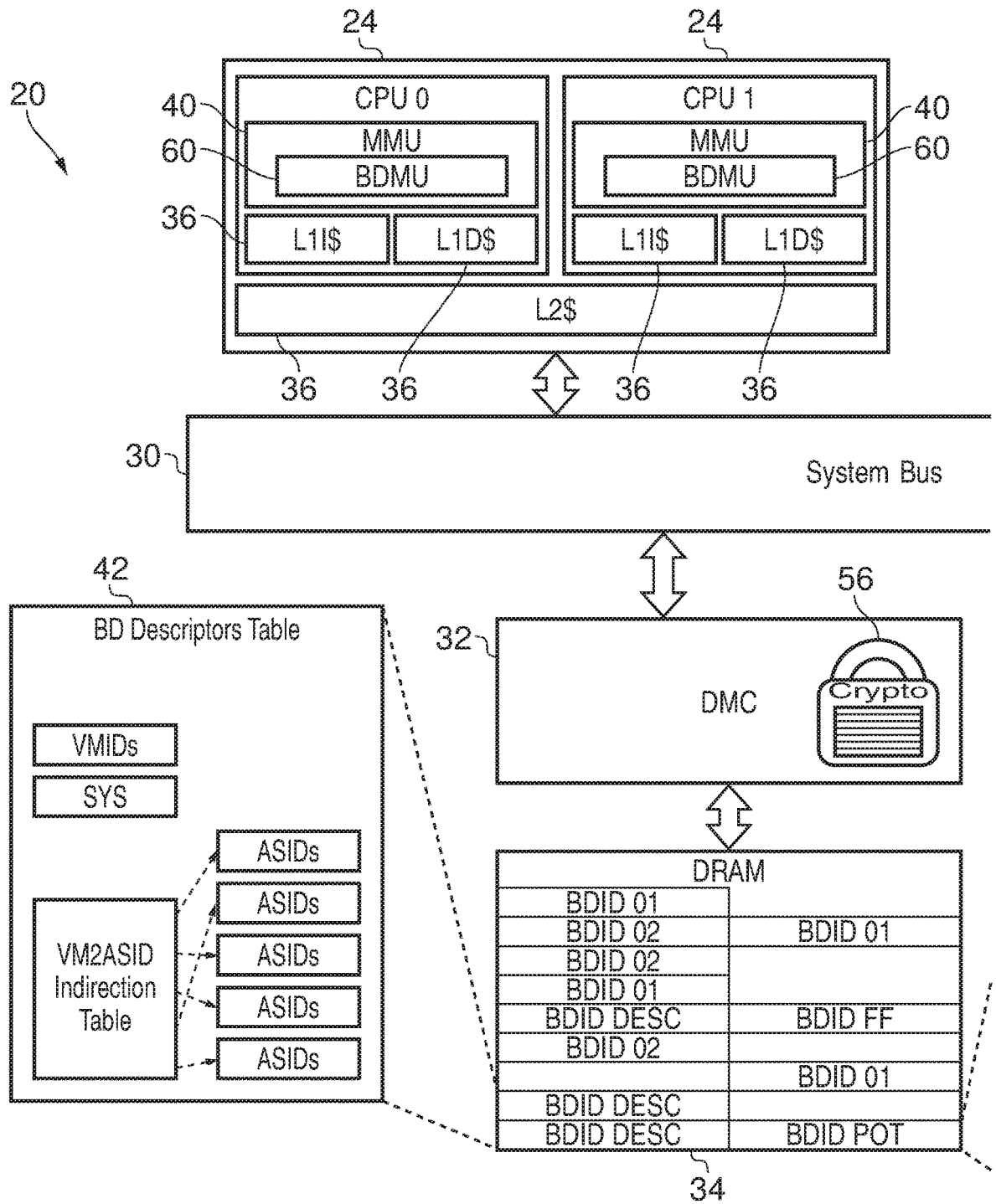
Figure 2:
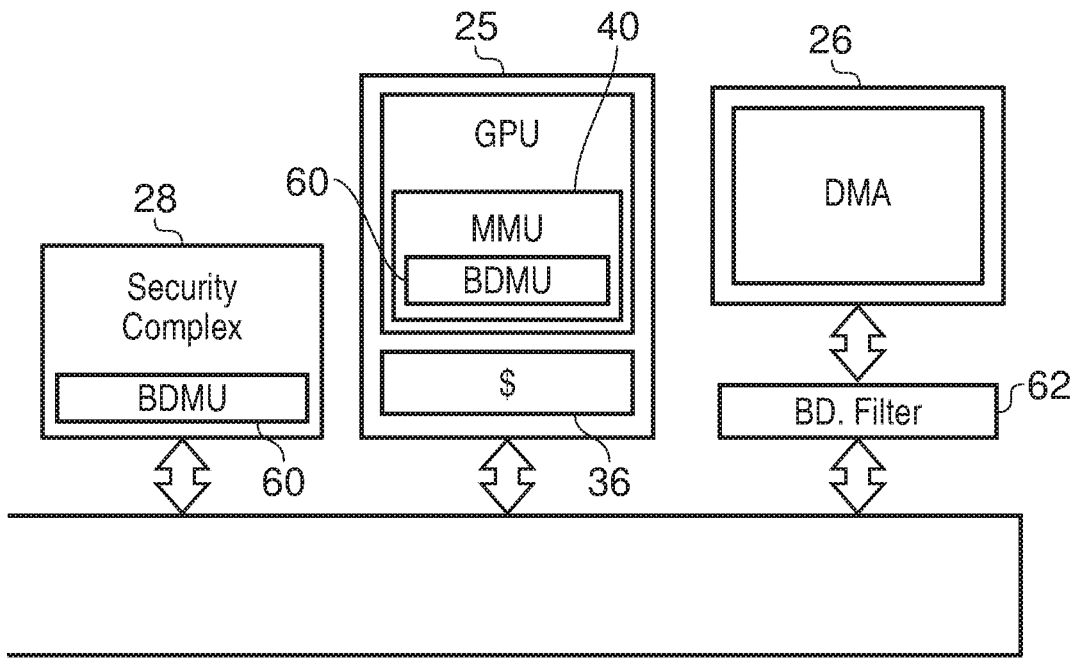

FIG. 2 shows an example of a data processing apparatus 20 comprising a number of bus masters including several processing circuits for processing data in response to instructions. In this example, the processing circuits include two central processing units (CPUs) 24, a graphics processing unit (GPU) 25) and a security complex 28 which is a dedicated processing unit for managing certain security functions as will be discussed below. The bus masters also include other devices which can execute processing tasks on behalf of one of the processing circuits, such as a direct memory access (DMA) controller 26 or an input/output (I/O) interface (not shown in FIG. 2) for controlling input or output of data to an external device for example. It will be appreciated that other types of master devices could also be provided. A system bus 30 couples each of the bus masters to a memory controller (DMC) 32 which controls access to memory 34. In this example, the memory is implemented using dynamic random access memory (DRAM), but it will be appreciated that other forms of memory or other types of data store could also be provided. Each bus master 24, 25, 26, 28 may issue data access transactions (reads or writes) to the memory controller 32 via the bus 30, and the controller controls the memory 34 to service the transactions.

A number of caches 36 are provided for caching data or instructions local to the processing circuits 24, 25. The CPUs 24 each have their own level 1 instruction cache and level 1 data cache but share a level 2 cache. The GPU 25 has a cache 36 for caching data or instructions. It will be appreciated that this is just an example of a possible cache hierarchy that could be used and other arrangements are possible. Each processing circuit (CPU or GPU) 24, 25 also has a memory management unit 40 for translating between a virtual address (VA), intermediate physical address (IPA) and physical address (PA) and enforcing access permissions set by certain processes using page tables, as will be discussed in more detail below.

The CPUs 24 and GPU 25 can execute instructions from any of the types of processes discussed above with respect to FIG. 1. Each of the processes 2, 4, 6, 10, 12, 14 of FIG. 1 may be referred to as a "blind domain" (BD) and has a corresponding blind domain identifier (BDID). For some of the processes, BDIDs could be allocated arbitrarily to the respective processes. For example, the hypervisor 2, secure monitor 14 or secure OS 10 could simply be assigned a corresponding BDID value. However, for other processes the BDID could be a concatenation of existing identifiers already assigned to the individual processes. For example, the BDID for a given application 6 executing under a particular virtual machine 4 may be formed at least in part from an application space identifier (ASID) associated with that application and a virtual machine identifier (VMID). A secure bit S indicating whether the process is associated with the secure domain or the normal domain could also be included in the BDID. In summary, each process is uniquely identifiable using its corresponding BDID.

A blind domain descriptor table (BDDT) 42 is provided within the memory 34 to track the state of each BD 2, 4, 6, 10, 12, 14. For example, for each BDID, the BDDT 42 may specify a state of the blind domain as one of the following:
  Invalid: No blind domain has yet been established for this BDID;
  Scrub: the BDID is being claimed by the security complex 28 (as described below, this may include performing an overwriting procedure to overwrite any data in memory 34 associated with a process which previously used the same BDID);
  Prepare: The security complex 28 is initialising a BD associated with that BDID to prepare the BD for execution;
  Execute: The BD has been initialised and is ready for execution or is being executed.

For example, the BDDT 42 may specify a 2-bit state field for each BDID to identify the state of the corresponding blind domain. The life cycle of states of a blind domain is described in more detail below. The BDDT entries for applications identified by ASID may be tracked using a VMID-to-ASID indirection table which maps a VMID of a given virtual machine 4 to the ASIDs of the applications 6 executing under that virtual machine 6. It will be appreciated that the BDDT 42 may also include other information associated with a given BD, not just the state identifier mentioned above.

Each blind domain (BD) may protect its data or instructions from any other blind domain. Any BD may request that it becomes an owner BD for a selected page of the physical address space. A page ownership table (POT) 50 is stored in memory 34 tracking which BD (if any) is the owner BD for each physical page of memory. The owner BD (also referred to as an owner process) for a given page of memory has the exclusive right to control access to that page. For example, the owner BD can set attributes in the page ownership table 50 which control whether other BDs are allowed to access the page. Each bus master is provided with protection hardware 60, 62 for enforcing the permission attributes set by the owner BD of a given page to prevent access requests targeting that page from other BDs being output onto the bus 30 if they violate the restrictions controlled by the owner BD. In this way, any process can prevent other processes (including higher privilege level processes) accessing its data or instructions.

As shown in FIG. 2, the page ownership table (POT) 50 includes a number of entries 52 each corresponding to a different page of the physical address space. The POT 50 is indexed by physical address. Each entry 52 of the POT 50 includes the following information:

an owner BDID field 54 which specifies the BDID of the BD which owns the corresponding physical page;
an attribute field 56 which specifies one or more attributes for controlling access to the corresponding physical page. These attributes are set by the owner BD identified in the BDID field 54;
an address field 58: for pages whose owner BD uses virtual addresses or intermediate physical addresses (e.g. applications 6, 12, or virtual machines 4), the address field 58 specifies the VA or IPA which mapped to the physical address of the corresponding physical page at the time the page was claimed by the owner BD;
a page state field (not illustrated in FIG. 2): indicating the state of the corresponding page. For example, each physical page may be in one of the following states:
Invalid: not owned by any BD;
Claiming: in the process of being claimed by the BD indicated in the BDID field 54, but not yet validly owned;
Valid: validly owned by the BD indicated in the BDID field 54.
optionally, a claim count field 60 which tracks the number of lines of the page which have been overwritten during an overwriting process performed when claiming ownership of a page (more details of which are described below).

It is also possible to store the claim counter 60 in a different location such as within registers of a CPU 24 or GPU 25 or a stack structure in memory 34, so the claim count field 60 could be omitted from the POT 50 if desired.

The attribute field 56 of a POT entry 52 for a given page is set by the owner BD for that page, to provide the owner BD with exclusive control over the way in which other BDs access the page. The attribute field 56 may include a range of attributes for controlling access to the corresponding pages, for example:

Sharing attribute indicating which processes other than the owner BDID can access the page. For example the sharing attribute may specify one of the following types of page:
Private: the page can only be accessed by the owner BD identified in the BDID field 54;
IO: the page can only be accessed by the owner BD identified in the BDID field 54 and any device 26 which has been claimed by the owner BD (see the discussion of claiming device ownership below);
Shared: the page can be accessed by the owner BD and one or more selected other BDs, but not by any other BDs. The selected other BDs could be identified by further attributes of the attribute field 56 or by control data stored separately from the page ownership table 50.
Global: the page can be accessed by any BD.
Read/write attribute indicating whether, when a BD other than the owner BD is allowed to access the page, that BD has read only access or both read/write access to the page.
Encryption attribute indicating a level of encryption to be applied for data to be written to the corresponding physical page.

As shown in FIG. 2, the memory controller 32 may include encryption circuitry 56 for encrypting data written to memory 34 and decrypting data read from the memory 34. The encryption circuitry 56 may maintain a number of secret encryption keys and each BDID may have its own key. The encryption circuitry 56 supports a number of different levels of encryption, ranging from no encryption at all (data is written to the memory in the clear), through successively stronger forms of encryption. In general, the stronger the encryption, the greater security, but the greater resource is consumed in encrypting and decrypting the data.

In some implementations, a given BD may specify the same level of encryption for all the pages owned by it. If the level of encryption is the same for all pages owned by a BD, an alternative would be to specify the level of encryption in that BD's entry in the BDDT 42, instead of in each POT entry 52 for the pages owned by the BD. However, specifying the level of encryption in the page table allows for faster performance because then the encryption circuitry 56 only needs to read one table 50 to identify both the owner BD for the page and the level of encryption, rather than reading the POT 50 and the BDDT 42.

However, in other embodiments, an owner BD may specify different levels of encryption for different pages that it owns. By allowing the owner BD to select the level of encryption required on a page by page basis, the strongest encryption can be reserved for the pages which really need it and pages storing less sensitive information can use a weaker level of encryption to save energy. This allows a better balance between security and energy consumption.

Hence, on a write the encryption circuitry 56 checks the POT entry 52 for the target address to determine the level of encryption applied to the corresponding page. The encryption circuitry 56 selects the appropriate encryption key for the owner BD indicated in the BDID 54 field of that POT entry 52, and encrypts the data using the key and the specified level of encryption, before writing the encrypted data to memory 34. Similarly, on a read access, the encryption circuitry 56 checks the POT entry 52 for the corresponding page to determine the level of decryption required and which owner BD's key should be used for the decryption, decrypts the data read from memory 34 and then outputs the decrypted data over the bus 30 to the master that requested the data.

Hence, each process can become an owner for a corresponding page of physical addresses and has exclusive control over whether other processes can access that page, including control over processes at higher privilege levels. This enables a virtual machine 4 for example to prevent a hypervisor 2 accessing its data or instructions, to address the problems discussed above.

Figure 3:
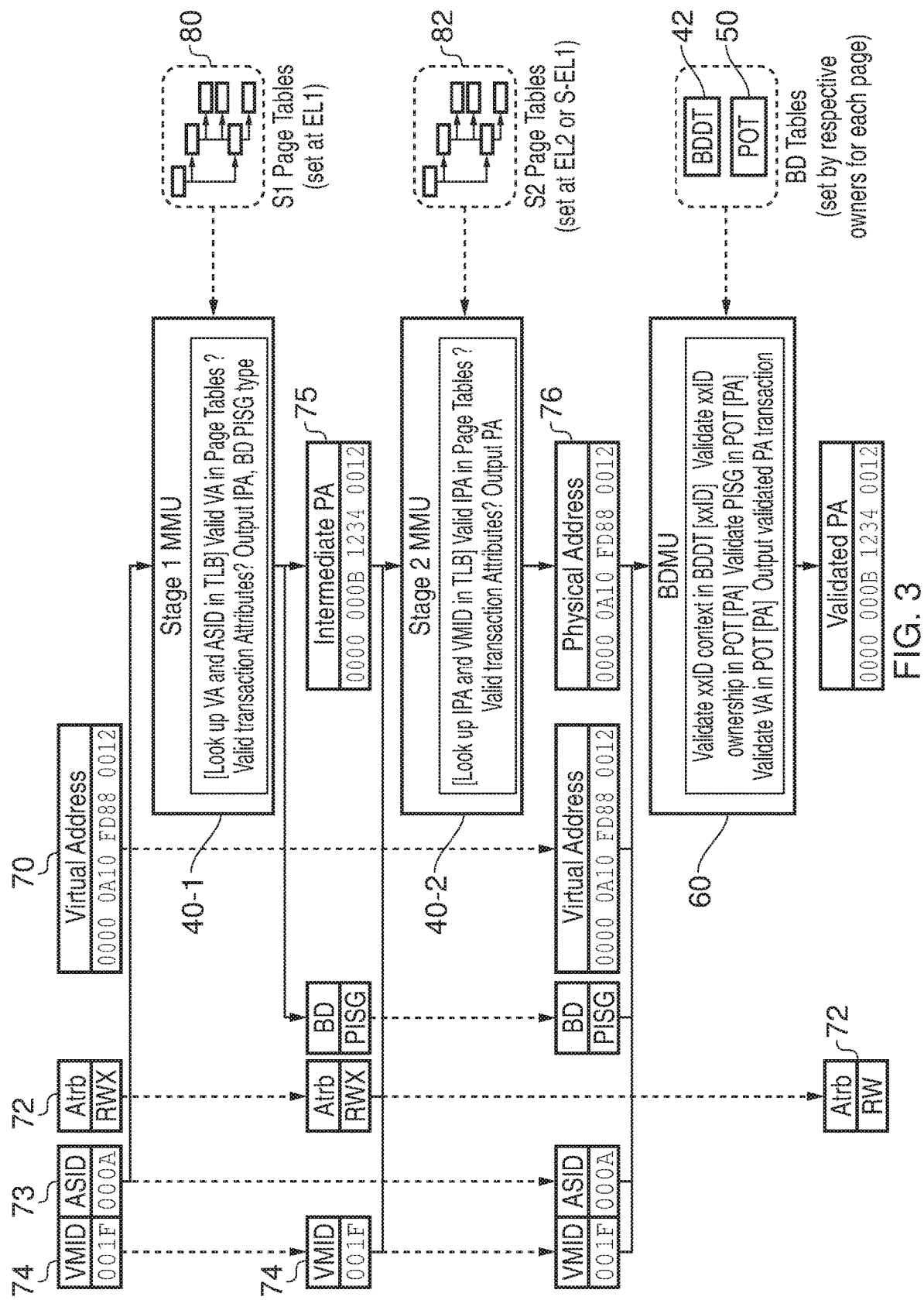

Enforcement of the policy set in the page ownership table 50 is carried out by a blind domain management unit (BDMU) 60 associated with each processing circuit 24, 25, 28. As shown in FIG. 3, the BDMU 6 may act as a further stage of transaction validation which operates on transactions which have passed any checks performed by the memory management unit (MMU) 40.

As shown in FIG. 3 the MMU 40 may include a stage 1 MMU (S1MMU) 40-1 and a stage 2 MMU (S2MMU) 40-2 for providing two stages of address translation respectively. The transactions input to the MMU comprise a virtual address 70 to be accessed, a transaction type attribute 72 specifying whether the transaction is a read or write transaction, an ASID 73 identifying the application 6 which issued the transaction, and a VMID 74 identifying the virtual machine 4 under which that application 6 is executing. The ASID and VMID may together be considered to form a context identifier identifying the context in which the transaction was executed.

The S1MMU 40-1 looks up the virtual address 70 and ASID 73 in a stage 1 translation lookaside buffer (S1TLB), which is a local cache within the S1 MMU for caching a subset of entries from stage 1 (S1) page tables 80 stored in memory 34. In the normal domain, the S1 page tables 80 are set by the virtual machine 4 which controls the application 6, and in the secure domain the S1 page tables 80 are set by the secure OS 10. Each S1 page table entry specifies a VA-PA or VA-IPA mapping for a corresponding page of the virtual address space together with attributes specifying whether the corresponding ASID has read or write permission for the corresponding page. If the S1TLB does not contain a corresponding entry for the VA 70 and ASID 73, a page table walk is performed to fetch the required entry from the S1 page tables 80. Once the required entry is in the S1TLB, the S1 MMU 40-1 checks whether an access of the type specified by the read/write attribute 72 is permitted for the specified ASID 73 and virtual address 70. If the access is not permitted then the transaction is rejected and a stage 1 access violation may be signalled. On the other hand, if the permissions are satisfied then a translated PA or IPA 75 corresponding to the input VA 70 is output.

If the input transaction was issued at one of exception levels S-EL0, S-EL1, EL2 or EL3, then the output of the S1MMU 40-1 is a PA and the stage 2 MMU 40-2 can be bypassed.

However, if the input transaction was issued by an application 6 or virtual machine 4 executing at EL0 or EL1, then the S2MMU 40-2 performs further address translation and access permission checking. The S2MMU 40-2 includes a stage 2 TLB (S2TLB) which caches a subset of entries from stage 2 (S2) page tables 82 in memory 34. The S2 page tables 82 are set by the hypervisor 2 (for the normal domain) or the secure OS 10 (for the secure domain). The S2MMU 40-2 looks up the S2TLB to check whether there is an entry for the specified IPA 75 and VMID 74, and if not performs a page table walk to fetch the required entry from the S2 page tables 82. When the required entry is in the S2TLB, the S2MMU 40-2 checks whether a transaction of the type specified in the attributes 72 is permitted, and if so outputs a translated PA 76 corresponding to the IPA 75. If the transaction is not permitted, a stage 2 access violation is flagged and the transaction is rejected.

Hence, each stage of the MMU 40-1, 40-2 can be considered to be access control circuitry for checking whether an access request satisfies access permissions set by a predetermined process at a given privilege level (e.g. the S1 MMU 40-1 enforces the permissions set by the virtual machine 4 or the secure OS 10, and the S2MMU 40-2 enforces the permissions set by the hypervisor 2).

The physical address 76 is then passed to the BDMU 60 to enforce any access controls set by the owner BD in the POT 50 for the corresponding page of the physical address space. In a similar way to the TLBs within each stage of the MMU 40, the BDMU 60 may include lookaside buffers for caching portions of the POT 50 and BDDT 42 from memory 34 (see FIG. 9 below). Hence, when a physical address 76 is received (whether from a physically addressed transaction from EL2, EL3 or S-EL1, or translated from a VA or IPA by the MMU 40), the BDMU 60 checks whether the required POT entry 52 and BDDT entry are in the respective lookaside buffers, and if not the required entries are fetched from memory 34. Once the required entries are available, the physical address is validated using a series of checks as follows:

The BDMU 60 checks whether the current context BD (the BD from which the transaction was generated) is a valid context in the BDDT 42. For example, the BDMU 60 may form the BDID of the current context BD from the VMID 74 and ASID 73 and check whether the corresponding BDID is marked as in the "Execute" state in the BDDT 42.

The BDMU 60 checks whether the current context BD is shown as the owner BD 54 in the POT entry 52 corresponding to the physical address 76.

If the current context BD is not the owner BD, then the BDMU 60 checks whether the current context BD is permitted by the owner BD to access the page (using the Sharing attribute described above)

If the current context BD is not the owner BD, then the BDMU 60 checks the Read/Write attribute of the corresponding POT entry to determine whether a transaction of the type specified in the attribute 72 is permitted by the owner BD.

If the current context BD is the owner BD, then the BDMU 60 checks whether a VA 70 or IPA 75 provided with the input transaction matches the VA/IPA in the address field 58 of the corresponding POT entry 52.

The BDMU 60 also checks whether an expected sharing attribute specified in the S1 page table entry for the current access matches the actual sharing attribute specified in the corresponding POT entry.

If any of these checks fails, the access is rejected and an access violation triggered. Otherwise, the physically address transaction is validated and is output onto the system bus 30. It will be appreciated that the checks described above could be performed in any order or could be performed at least partially in parallel.

Similarly, the BD filter 62 may control whether a transaction targeting a particular page of the physical address space is output onto the system bus 30 based on whether the owner of that page has marked the page as "IO" type in the attribute field 56 of the corresponding POT entry 52.

Figure 4:
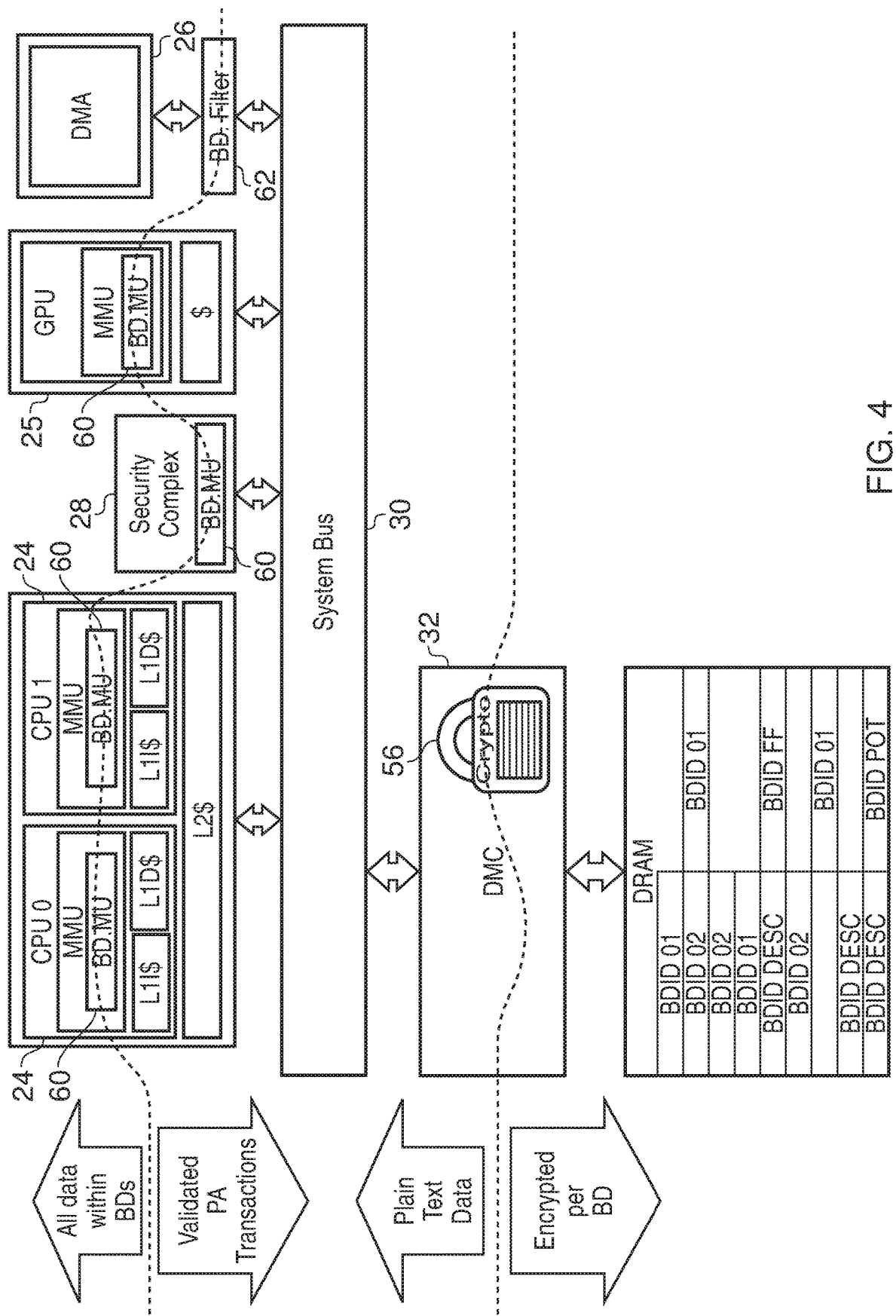
FIG. 4 illustrates an example of transactions at different points of a data processing apparatus.

Hence, as shown in FIG. 4, each bus master 24, 25, 26, 28 coupled to the system bus 30 may be provided with either a BDMU 60 or a BD filter 62 for validating physically addressed transactions, so that all transactions output on the system bus are validated transactions specifying physical addresses and so there is no need for any subsequent validation at the memory controller 32. An alternative would be to move the BDMU functionality 60 to the memory controller 32 so that transactions which have been validated by the MMU 40, but not yet compared against any permissions set in the POT 50 by the page owner, are output onto the bus and then checked against the POT 50 when they reach the memory controller 32. However, providing the BDMU 60 is advantageous because it reduces bus traffic by preventing transactions which would fail the POT 50 checks being output onto the bus, and avoiding the need for additional tags to be transmitted from the bus masters to the memory controller identifying the current context BD associated with each transaction. Conversely, the encryption/decryption circuitry 56 is provided at the memory controller 32 so that data written to memory can be encrypted to prevent hardware attacks, but there is no need for the bus masters 24, 25, 26, 28 themselves to have any encryption capability.

Figure 5:
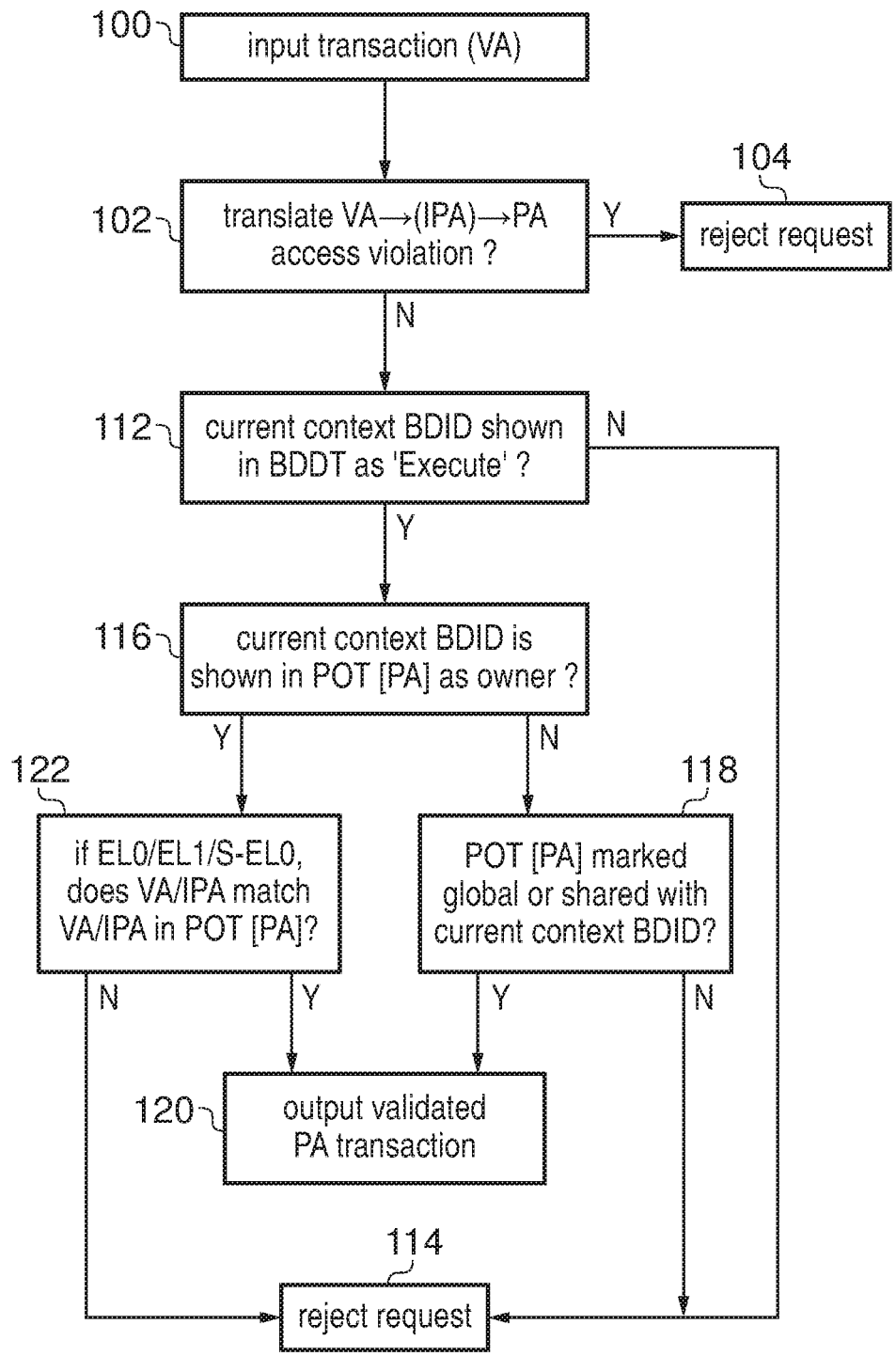
FIG. 5 illustrates an example method of validating access requests.

FIG. 5 shows a method of checking whether a data access transaction (access request) issued by one of the processing circuits 24 is permitted. At step 100 an input transaction is received specifying a VA 70. At step 102 the S1MMU 40-1 looks up the S1TLB for an entry corresponding to the input VA 70 and the current context (VMID, ASID). The S1MMU 40-1 checks whether there is a violation of the access permissions set in that entry. If there is a S1 access violation, then at step 104 the transaction request is rejected. If there is no S1 access violation, a translated IPA or PA is output. Also, the PISG state (expected sharing attribute) for the page is output by the S1 MMU 40-1, as will be discussed in more detail below. If the transaction was issued at EL2, EL3, S-EL0 or S-EL1 then the translated address is a PA and the S2MMU 40-2 is bypassed. If the transaction was issued at EL0 or EL1 then the output address is an IPA and a second stage of address translation is performed. In this case, the S2MMU MMU 40-2 similarly looks up the S2TLB for an entry corresponding to the IPA 75 and the current context (VMID). The access permissions in that entry are checked and if there is an access violation then again the request is rejected at step 104. If the access is permitted by the S2MMU 40-2 then the IPA is translated into a PA 76 which is output to the BDMU 60.

Hence, provided there is no access violation at either the stage 1 or stage 2 address translation, a physical address is obtained. At step 112 the physical address is provided to the BDMU 60 which checks whether the current context's BDID is shown in the BDDT 42 as being in the "Execute" state. If not, then at step 114 the request is rejected. In order to progress to the Execute state, that BDID would first need to progress through the "Scrub" and "Prepare" states as will be discussed below. This step of validating the BDID prevents the secure initialisation process being circumvented by issuing accesses for BDIDs which have not yet been initialised securely. Again, a local lookaside buffer caching some recently seen entries of the BDDT 42 may be maintained within the BDMU 60 to speed up checking of BDDT entries.

If the current context's BDID is validated as in the "Execute" state, then at step 116 the BDMU 60 checks the POT entry 52 corresponding to the required physical address 76 (the notation POT[PA] refers to the corresponding POT entry 52). Again, this may be accessed within a local POT lookaside buffer provided within the BDMU 60 for caching a subset of recently encountered POT entries for quicker access. The BDMU checks whether the corresponding POT entry 52 identifies the current context's BDID as the owner BD for the target page. If not, then at step 118 the BDMU checks whether the sharing attribute for the corresponding POT entry 52 is marked as either "Global" or "Shared" with the specific BDID of the current context. The BDMU 60 may also check whether the read/write type of the access request matches the permitted types defined for BD's other than the owner in the attribute field 56 of the corresponding POT entry 52. If these checks are passed, then at step 120 the BDMU validates the transaction and outputs it onto the system bus 30. On the other hand, if the page was not shared with the current context's BDID (e.g. the page was Private or Shared with a different BD only), or the access request specified a write but the page is marked Read only, then the request is rejected at step 114.

On the other hand, if at step 116 the current context is the owner BD for the corresponding page, then there is no need to check the sharing attributes 56 since the owner BD is permitted to access its own page. However, at step 122, if the source of the transaction is at privilege level EL0, EL1 or S-EL0, then the BDMU 60 checks whether the VA or IPA of the transaction matches the VA or IPA stored in the address field 58 of the corresponding POT entry 52. For transactions issued at EL0 or S-EL0, the BDMU 60 checks whether the VA of the transaction matches the VA in the address field 58, while for transactions issued at EL1, the BDMU 60 checks whether the IPA of the transaction matches the IPA in the address field 58. If there is a match, the transaction is validated and output on the bus 30 at step 120. If the addresses do not match, the request is rejected at step 114.

It may not be immediately apparent why this last check of the VA or IPA against the VA or IPA recorded in the POT 50 is useful. Consider the following situation:

A hypervisor 2 may for example allocate two physically addressed pages PA0, PA1 to a particular virtual machine 4 with address mappings in the S2 page tables 82 as follows:

| IPA | PA |
| --- | --- |
| IPA4 | PA1 |
| IPA9 | PA0 |

The virtual machine 4 could then take ownership of both of these pages and set the sharing attribute in the POT 50 as follows:

| PA | Shared? |
| --- | --- |
| PA0 | Global |
| PA1 | Private |

The virtual machine 4 could then for example include some code writing sensitive data to IPA4 (which the VM 4 would expect to have been marked as Private in the POT 50), to prevent other processes accessing this data.

However, before the VM 4 starts the secure portion of the code for writing the sensitive data, the hypervisor 2 could modify the S2 page tables 82 as follows:

| IPA | PA |
| --- | --- |
| IPA4 | PA0 |
| IPA9 | PA8 |

If the VM 4 now executes its secure portion of the code using intermediate physical address IPA4, this would now be mapped to a different physical address PA0, which is marked in the POT 50 as a "Global" page. The VM 4 would write its sensitive data to the "Global" page, exposing this information to any other process including the hypervisor 2 itself.

This problem can be avoided by providing information 58 in the POT 50 to "lock" the address mapping for an owned page to a certain mapping, so that an access violation can be triggered if another process changes the address mappings in the page tables 80, 82 after the ownership attribute information has been set in the POT 50. For example, when a page is claimed by an owner BD, the current VA-PA or IPA-PA mapping at the time of claiming the page may be recorded using the address field 58 of the POT entry 52 corresponding to that physically addressed page. In the example above, the POT 50 might be as follows:

| PA | Shared? | IPA |
| --- | --- | --- |
| PA0 | Global | IPA9 |
| PA1 | Private | IPA4 |

Later, when the VM 4 attempts to access the private page using intermediate address IPA4, if the hypervisor 2 has in the meantime remapped IPA4 to point to PA0, this will be detected because the intermediate address of the access, IPA4, will now match the intermediate address IPA9 in the POT entry 52 for physical page PA0. Therefore, an error can be flagged and the VM 4 can halt its secure processing to avoid exposing sensitive information to other processes. This avoids attacks of the type discussed above. The VM 4 could then request ownership of IPA4 and IPA9 again to set the required access control permissions for the physical pages PA0, PA8 which are now mapped to these IPAs.

Hence, including a reverse address translation mapping in the POT 50 can help to avoid attacks of the type described above caused by changes in the page tables. While the example above discusses a hypervisor modifying the page table mappings for a page owned by a virtual machine 4, a similar technique can be used to prevent a virtual machine 4 modifying the page table mappings for a page owned by an application 6 or trusted application 12, in which case a VA would be stored address field 58 rather than the IPA.

Although not shown in FIG. 5, the method of validating the transaction may also include an additional step of validating whether the "Sharing" attribute of the POT entry 52 corresponding to the target PA matches an expected attribute specified in the S1 page table entry for the corresponding VA. When a page owner sets the Sharing attribute for a given page (which indicates whether the page is Private, IO, Shared or Global as discussed above), this may also trigger an update of the S1 page tables so that the corresponding page table entry specifies a corresponding attribute. In some cases, the page table entry could be updated initially only in the S1 TLB, and then the S1 page tables 80 in memory could be updated later when the corresponding page table entry is evicted from the S1 TLB. Later, when an access request is issued to that page, the S1 MMU 80 may output the expected Sharing attribute (PISG type) specified in the corresponding S1 page table entry, and the BDMU 60 may check whether the expected Sharing attribute matches the Sharing attribute specified in the POT entry 52 corresponding to the PA. If there is a match, then the access request can be validated (subject to the other checks described above). However, if the actual Sharing attribute does not match the expected Sharing attribute specified in the S1 page table entry, then the access request is rejected. This guards against potential attacks as follows.

For example, a given BD may claim ownership of a given physical page and mark it as Private in preparation for writing sensitive information to that page. However, before the BD starts writing the sensitive information, another BD could claim ownership of the same page and could mark that page as Global. When the previous owner BD then attempts to write the sensitive information to the page, as the page is marked Global by the current owner, the request could be validated, and so this could potentially lead to exposure of the sensitive information to other processes. This can be avoided by writing information to the corresponding page table entry indicating the page sharing type expected for that page, and checking whether this matches the actual sharing type recorded in the POT when accessing that page.

In the above example, the expected Sharing attribute (PISG type) is specified in the S1 page tables, but other examples could specify this in the S2 page tables. Also, in some cases some pages may have the expected Sharing attribute specified in the S1 page tables while other pages have the Sharing attribute specified in the S2 page tables, depending on which process set the Sharing attribute.

In summary, the BDMU 60 provides an additional layer of access permission checking on top of the MMU 40, so that validation of transactions requires checks to be passed in both the MMU 40 and BDMU 60. Whereas the MMU 40 checks permissions set by processes at certain privilege levels (e.g. EL1 controls the S1 page tables and EL2 controls the S2 page tables), the BDMU 60 enforces permissions which can be applied to particular pages by owner processes executing at any privilege level. Hence, while the hypervisor 2 for example can still allocate particular regions of the address space to a particular virtual machine 4 and prevent other VMs 4 accessing those regions using the S2MMU 40-2 and S2 page tables, the virtual machine 4 itself can prevent the hypervisor 2 accessing some pages within its allocated "pool" of pages by setting suitable permissions in the POT 50 to control the BDMU 60 to reject any requests from the hypervisor 2 for those pages. This enables a system in which each "blind domain" can enforce its security so that it can hide data from any other domain within the system.

Figure 6:
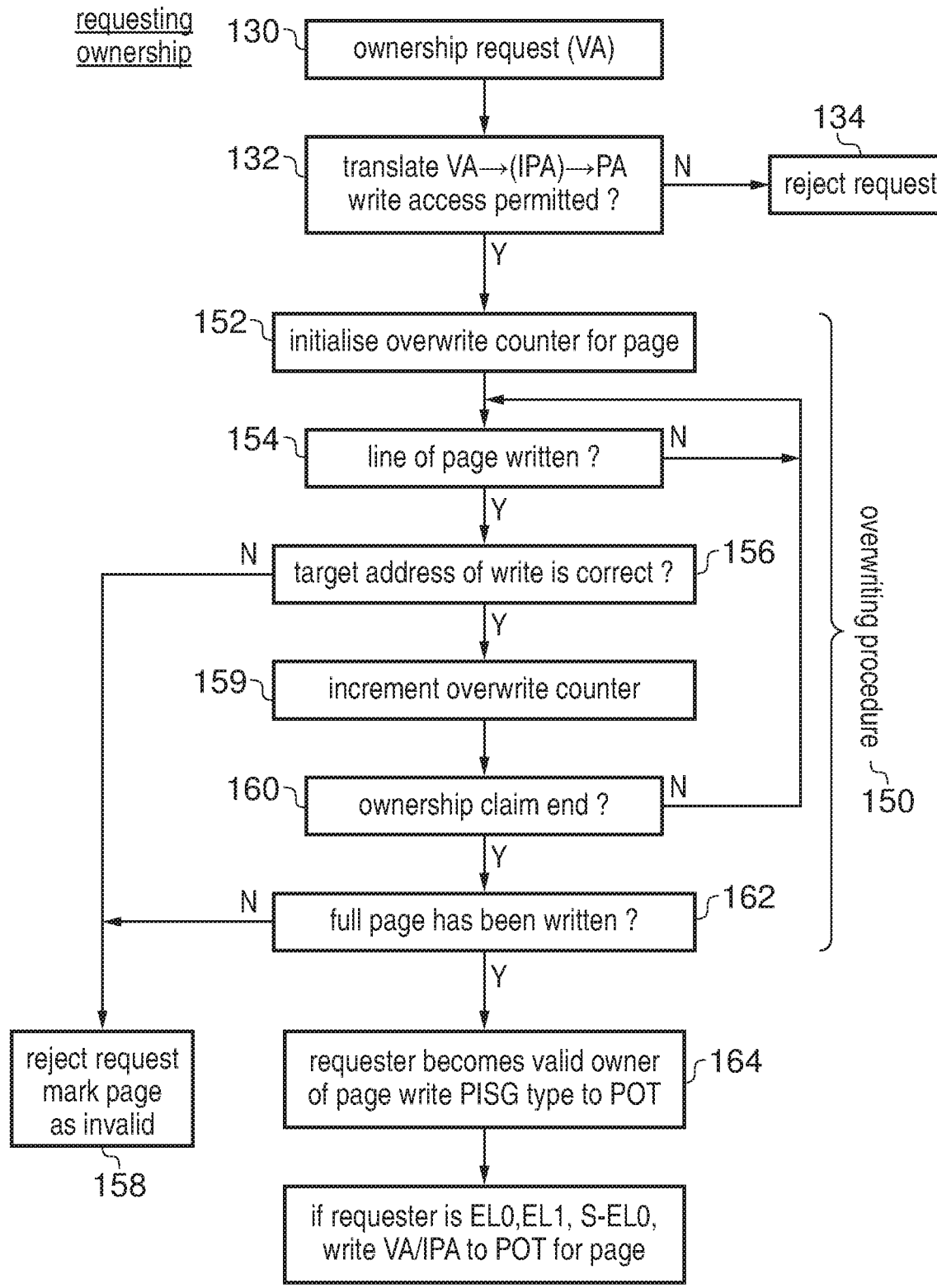
FIG. 6 illustrates an example method for a requesting process to request ownership of a corresponding page of physical addresses.

FIG. 6 shows an example of a method by which a BD may request ownership of any page of the physical address space to which it has write access. On requesting ownership of a page, it is possible that a previous owner of the same physical page may previously have written secure data to that page. To prevent leakage of data when ownership of a page transfers between different BDs, the new owner may be required to complete an overwriting process 150 for overwriting the data in each location of the requested page before becoming the valid owner of the page. The particular data value written to each location does not matter, so long as the previous data is overwritten—e.g. each location could be written with a 0 or any other dummy value. By requiring the new owner to perform a destructive claim sequence to overwrite any existing data within a page before it can validly claim ownership, security of data can be enforced even once a particular BD which previously owned a given page is no longer in existence (for example the hypervisor 2 may have terminated execution of a given VM 4). In some examples, some dedicated hardware could be provided within the processing circuits 24, 25, 28 to perform the overwriting sequence when page ownership is requested. However, in the example given below the software associated with the new owner BD performs the overwriting by triggering a series of writes to each location of the page being claimed, but some control hardware in the processing circuitry 24, 25, 28 executing that software checks whether the new owner BD has successfully completed the overwriting process 150 and prevents the page being marked as valid in the POT 50 until this is done.

The ownership request may for example correspond to the prospective owner BD executing an ownership claim instruction specifying an address corresponding to the page to be claimed. At step 130 an ownership request is received specifying a VA to identify the page for which ownership is requested. At step 132, the MMU 40 determines whether write access is permitted for the specified page, and if either stage 1 or stage 2 of the MMU 40 determines that write access is not permitted, then at step 134 the request is rejected. Hence, a BD is prevented from claiming ownership of a page to which it is not itself allowed to write data. If write access is permitted, then the VA is translated into a PA (either directly or via an IPA) and the PA is output.

The method then proceeds with the overwriting procedure 150 for overwriting the data in each location of the page corresponding to the target PA. The claim counter 60 described above is used by the control hardware to track the progress of the overwriting process and count the number of lines of the page that have been overwritten so far. At step 152 the overwrite counter 60 is initialised to point to the first address in the page, e.g. the address which has an offset of zero from the base address of the page. At step 154 the control hardware waits for the requester BD (the BD which requested ownership) to trigger a write. When a write is performed, at step 156 the control hardware checks whether the target address of the write is correct. For example, the control hardware may require that the requester BD iterates through each line of the page in a fixed order, so may simply check whether the next address has been written to (e.g. whether the write offset matches the increment counter). If the address is not correct, then at step 158 the ownership request is rejected and the page marked in the POT as invalid, to prevent the requesting BD circumventing the overwriting procedure by writing to other addresses not in that page, or repeatedly writing to the same address, for example. When the ownership request is rejected, if the requester BD wishes to request ownership again, they will have to start again with a new ownership request and correctly complete the overwriting procedure 150.

Figure 8:
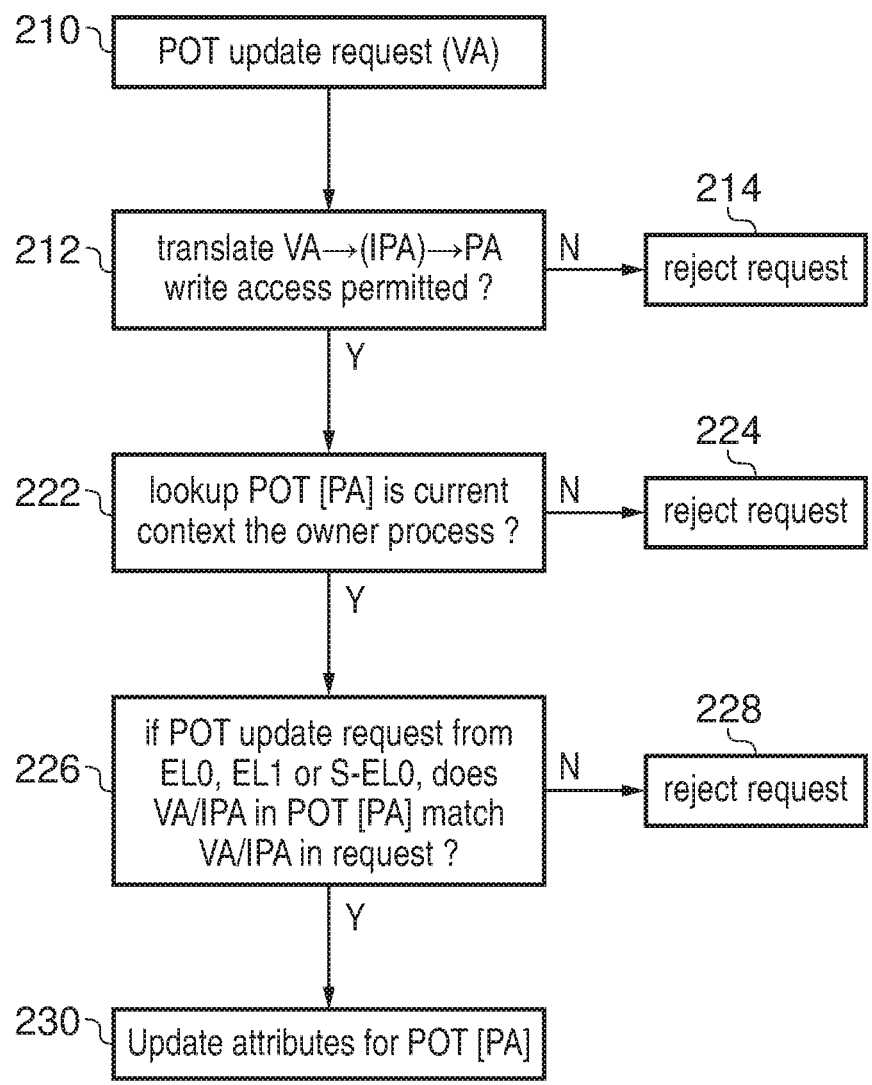
FIG. 8 shows an example of updating attributes in an ownership table.

If the target address was correct at step 156, then at step 159 the control hardware increments the overwrite counter. At step 160 the control hardware checks whether the requesting BD has declared that it has reached the end of the ownership claim process. For example, the requesting BD may execute an ownership claim end instruction to flag that it has finished the overwriting procedure 50. If the ownership claim end has not been reached then the method returns back to step 154 to check for the next line of the page to be overwritten. The process loops through steps 154 to 160 a number of times for each line of the page. Eventually the requesting process declares that it has reached the end of its overwriting procedure 50, and at step 162 the control hardware checks whether a full page has been written (e.g. whether the overwrite counter matches the number of lines in the page). If a full page has not been written, the ownership request is again rejected at step 158 and the page marked as invalid in the POT 50. If the full page has been written, then the page is marked as valid at step 164 so that the requester BD now becomes the valid owner of the page and so can exclusively control access to the page. Also, the PISG type (Sharing attribute) for the page is written to the corresponding POT entry 52. In some cases, newly claimed pages may by default be marked as Private initially, with a subsequent change of attribute being required (e.g. as shown in FIG. 8 or 14 below) if the new owner wishes to change the page to IO, Shared or Global. Alternatively, it may be possible to specify in the initial ownership request what value of the Sharing attribute is to be specified for that page. Updating the Sharing attribute may also trigger an update to the corresponding page table entry in the S1 TLB and/or S1 page tables 80, to encode the expected Sharing type so that it can be validated against the POT sharing attribute on later accesses to memory.

At step 166 if the requester BD is a process at EL0 or S-EL0 then the VA specified in the ownership request is written to the address field 58 of the POT entry 52 for the claimed page, while if the requester BD is a process at EL1 then the IPA obtained by the MMU is written to the address field 58, to lock the reverse PA-VA or PA-IPA mapping into the POT to prevent against the attacks of the type discussed above. It will be appreciated that in other embodiments step 166 could be performed earlier, e.g. as soon as the ownership request was received. Similarly, the BDID of the requester process could be written to the POT 50 at any time during the method shown in FIG. 6, as long as the POT entry 52 does not become valid until step 164.

An example of some pseudocode for the requester BD to execute the ownership request and the overwriting procedure 150 is shown below:

```
BD.Page.Invalidate(VA1)        // broadcast page invalidate
BD.Page.Claim.Start(VA1)       // requires an invalid page
line = (*64byte_ptr) VA1
do while ( line < (VA1 + PAGESIZE) )
       DCZ.WT(line++)          // ordered zeroing of page
BD.Page.Claim.End(VA1)         // make page valid
```

Figure 7:
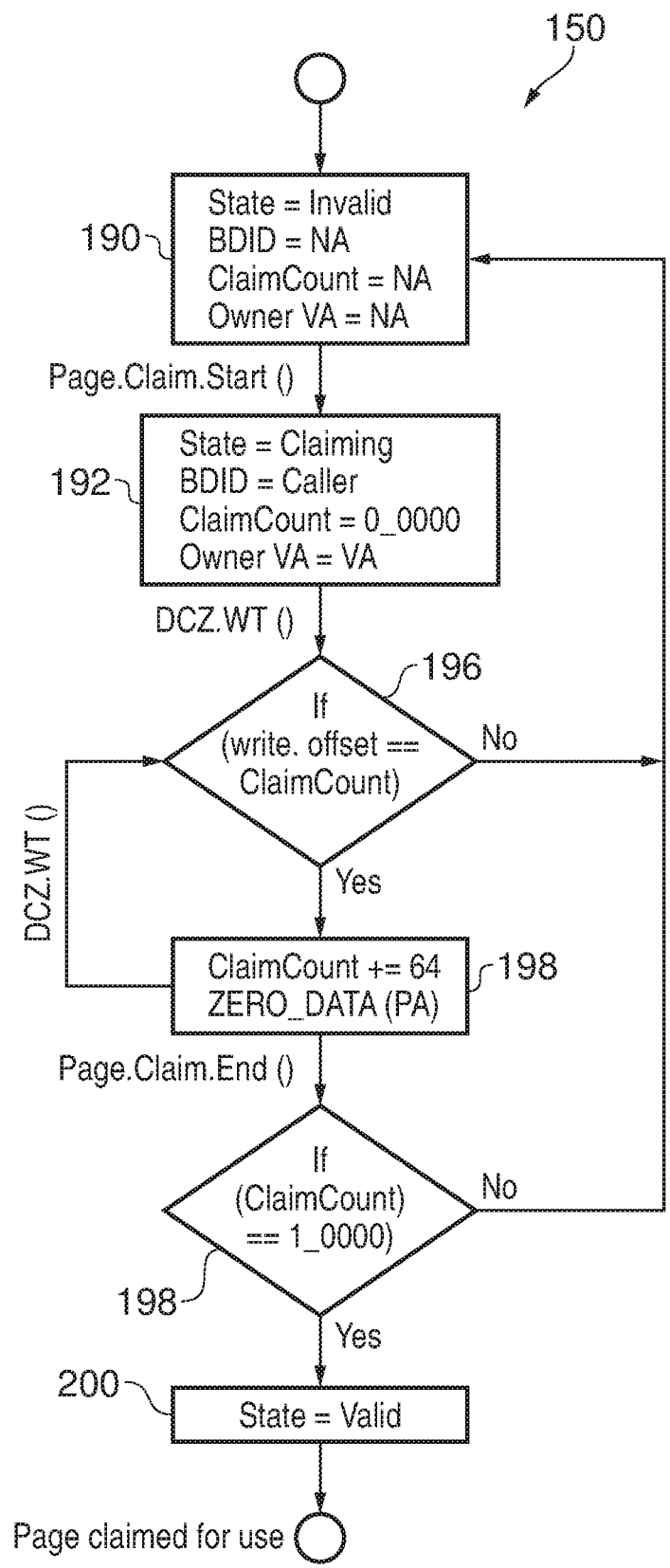
FIG. 7 shows an example of an overwriting process.

FIG. 7 is a flow diagram explaining the pseudocode. An application for example wishes to claim ownership of a page corresponding to virtual address "VA1". Before requesting ownership, the requester BD executes an invalidate instruction (BD.Page.Invalidate) to invalidate any POT entries associated with address VA1 from any lookaside buffers within the BDMUs 60. This ensures that following the ownership claim, old data will not be resident with the lookaside buffers. Hence, at step 190 of FIG. 7 the page is initially in the Invalid state. The requester BD then executes a page claim start instruction (BD.Page.Claim.Start) to issue an ownership request. This causes the physically addressed page PA1 (whose address is obtained by translating VA1 using the MMU 40) to transition to the "Claiming" state. The BDID of the Requester (Caller) BD is written to the BDID field 54 of the POT entry 52 for page PA1. Virtual address VA1 which currently maps to PA1 is written to the address field 58. The claim counter is initialised at zero.

The requesting process then executes a data zeroing instruction (DCZ.WT) to start the first overwriting operation. In this example, the data zeroing instruction zeroes 64 bytes of the page at a time, but it will be appreciated that other examples could act on blocks of data of other sizes. At step 196 the control hardware checks whether the write offset of that instruction matches the claim count. If there is no match, the request is rejected and the page transitions back to the "Invalid" state at step 190, so the requester BD will have to execute another BD.Page.Claim.Start instruction if they want to make another attempt at claiming ownership. On the other hand, if the write offset matches the claim count, then at step 198 the claim counter 60 is incremented, and the requester BD executes another data zeroing instruction DCZ.WT at step 194. Steps 196, 198, 194 loop until the requester BD executes the page claim end instruction (BD.Page.Claim.End) to signal it has finished all the overwriting operations. At step 198, the control hardware checks that the claim counter matches the number of addresses in the page. If the number of bits of the claim counter is selected corresponding to the page size, the claim counter will overflow when all the locations in the corresponding page have been written to, so the control hardware can simply check the overflow bit of the claim counter which if equal to 1 will show that the overwriting procedure was completed. If the claim counter has not overflowed at step 198, then the page again transitions back to the invalid state at step 190 and the requester BD will have to start again to claim ownership. If the claim counter has overflowed at step 198, then at step 200 the page PA1 becomes valid and now the owner can set the attributes for this page.

A similar destructive overwriting procedure 150 can also be performed when recycling a particular BDID for use by a new process. For example, to transition a given BDID from the "Invalid" state to the "Prepare" state, the BDID is first transitioned to the "Scrub" state. While in the "Scrub" state, the hardware may check that the overwriting procedure 150 is performed to overwrite each address within each page for which the given BDID is currently shown as the owner in the POT 50. The hardware may also require that each POT entry 52 associated with that BDID is invalidated. The actual overwriting operations may be performed in software by the hypervisor 2 or other process requesting that a new BD is established, but the hardware may check that the overwriting procedure is successfully completed and prevent the BDID transitioning to the "Prepare" state until it has been successfully completed. This prevents sensitive information associated with the old process having that BDID from being leaked to a new process sharing the same BDID.

Other embodiments could omit the "Scrub" state, but a transition from the "Invalid" state to the "Prepare" state could be prohibited until the overwriting process has been successfully completed to overwrite the data in each page recorded in the POT 50 as being owned by the corresponding BDID and invalidate each POT entry 52 associated with that BDID.

FIG. 8 shows a method for the owner BD of a given page to update the attributes in the POT 50. At step 210 a POT update request is issued specifying a VA identifying the target page and one or more attributes to be written to the POT entry 52 for that page. At step 212 the MMU 40 checks whether write access to that page is permitted, and if either the S1 or S2 MMU 40-1, 40-2 signals an access violation then the request is rejected. If write access is permitted, then a translated PA is obtained (either directly from the VA or via an IPA).

At step 222 the POT 50 is looked up using the physical address to determine whether the current context BD which issued the update request is the owner BD for the required page. If not then at step 224 the request is rejected.

If the current context BDID is the owner for the required page then at step 226 the address field 58 is checked against the VA/IPA of the update request (for requests originating from EL0, EL1 or S-EL0), to check whether the address mapping is still the same as when the POT entry 52 was allocated. If not, then at step 228 the update request is rejected. If the addresses match, then at step 230 the attributes of the corresponding page ownership table entry are updated based on the attributes specified in the update request. For example, the owner of the page could change the attributes so that a private page is now made shared or a shared page is made private, or could change whether read or write is permitted for that page. If there is a change to the sharing attribute, then this may also trigger a corresponding update to the expected sharing attribute (PISG state) recorded in the S1 page table entry in the S1 TLB or page tables 80.

Step 226 is optional and another embodiment could proceed from step 222 direct to step 230, since the change of address mapping could in any case be detected when a memory access is later issued as shown in FIG. 5 above. Nevertheless, if a change of address mapping is flagged when updating the POT attributes, this could flag earlier to the owner BD that there is a potential problem.

Figure 9:
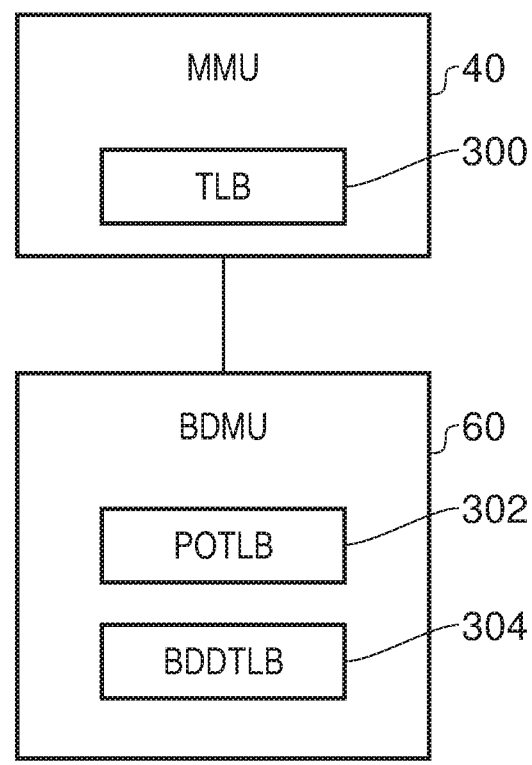
FIG. 9 illustrates an example of instructions for invalidating entries in a lookaside buffer.

As shown in FIG. 9, the BDMU 60 may have a page ownership table lookaside buffer (POTLB) 302 for caching recently accessed entries of the POT 50 and a BDDT lookaside buffer (BDDTLB) for caching recently accessed entries of the BDDT 42. These operate in an analogous way to the TLBs 300 within the MMU 40. As shown in the lower part of FIG. 9, the system bus 30 and processing units 24, 25, 28 may support invalidation instructions for invalidating entries of the POTLB 302 or BDDTLB 304. When a processing unit 24, 25, 28 executes one of these instructions, a command is broadcast over the bus 30 to each of the BDMUs 60 in the system, to trigger each BDMU 60 to invalidate entries from the TLBs 302, 304. Instructions 310, 312 are for invalidating entries of the POTLB 302. They can be used just prior to claiming ownership of a page or updating attributes in the POT 50 for example. Instruction 310 triggers a BDMU 60 to invalidate all its entries from the POTLB 302. Instruction 312 triggers a BDMU 60 to invalidate only those entries of the POTLB 302 which correspond to a specified page address (if the instruction specifies a VA or IPA, it is translated to a PA by the MMU and a physically addressed invalidate transaction is broadcast to the BDMUs 60 to invalidate the corresponding POT entries). Similarly, instructions 314, 316 are for invalidating entries of the BDDTLB 304, with instruction 314 triggering invalidation of all entries of the BDDTLBs 304 and instruction 316 invalidating only entries associated with a specified BDID. Following invalidation, when a subsequent access request requiring a particular BDID or page is encountered, the corresponding entries would need to be fetched from the main BDDT 42 or POT 50 in memory 34.

In some cases similar invalidation commands could be generated automatically as a result of other instructions executed by a given BD. For example, when a process executes an invalidation instruction to invalidate an entry of the POT 50, this could automatically result in generation of a broadcast invalidation command by hardware within the processing circuit 24, 25, BDMU 60 or memory controller 32 to trigger corresponding invalidations of entries in the BDMUs 60. Similarly, an update to an POT entry, or a lifecycle update or change in the status of a BD could result in an invalidation of POT or BDDT entries in the BDMUs 60.

Some specific examples have been discussed above. However, the technique is not limited to these precise examples. For instance, the examples above manage ownership of blocks of memory in units of pages, but the POT 50 could have entries corresponding to blocks of physical addresses of some other size (which could be multiples of pages or could correspond to more arbitrary blocks of addresses which do not necessarily need to correspond with the same sized pages used by the MMU 40).

While the examples above show a system comprising one page ownership table 50, in some cases there could be multiple POTs 50 in the same system. For example, if there are multiple memory controllers for controlling different DRAMs which are disjointed in physical memory, then it could be useful to provide a separate POT 50 for each memory controller/DRAM.

Also, while the examples above show the commands for controlling and updating the POT being issued by the owner process, in other examples these commands could come from another process which is trusted by the owner process. For example, in some systems the POT 50 could be managed on behalf of the owner domains by a process running on the security controller 28. Hence, when the owner process requires ownership of a page to be requested or an update to the POT 50, it could send a command to the trusted process (e.g. a process running on the security controller 28) which triggers the trusted process to issue an ownership request or update request. Similarly, the overwriting (destructive claiming) process described above could be performed by a trusted process which is not necessarily the owner process.

Also, while examples above describe executing an instructions to trigger an ownership request or POT update request, in other examples a request for ownership or table update could be triggered by other forms of commands. For example, the commands could be instructions, a direct I/O operation to a hardware controller for controlling the POT, or a (trusted) function call. Similarly, the ownership claim start and end commands need not necessarily be instructions and could be other forms of command.

FIG. 10 schematically illustrates the secure initialization of a guest execution environment (GEE). The guest execution environment can take a number of different forms, e.g. a stand alone application, an operating system supporting execution of one or more application programs, or even a further virtualization system. The secure initialization is started by the sending of a request to initiate a guest execution environment from a source of executable code for that guest execution environment. The request to initiate is sent to a hypervisor. The request may, for example, be the result of a user wishing to initiate some desired processing using a virtualized computer system (cloud based computing system) controlled by the hypervisor. The request to initiate the guest execution environment is accompanied at the same time (or potentially at a later time) by an encrypted version of executable code for at least the first portion of the execution of the guest execution environment. This encrypted executable code may be encrypted to help protect its security during transfer to its intended recipient in a variety of different ways. In this example, the encrypted executable code is encrypted with a public key of a public/private key pair. The private key pair is held by, and secret, to a security controller (described later).

The hypervisor receives the request to initiate the guest execution environment creates a new virtual machine (VM) and allocates with the physical memory address space the pages to be used by the guest execution environment as well as setting up other parameters associated with the guest execution environment, as is normal in the action of a hypervisor. The hypervisor then forwards to the security controller the request for initialization of the guest execution environment, the encrypted executable code, page identifiers indicating the pages of physical memory address space that have been allocated by the hypervisor to the guest execution environment and a blind domain identifier to be used by the guest execution environment. It will be understood that in a typical system the hypervisor will allocate a large amount of physical memory address space to a guest execution environment which may use some or all of this allocated address space in its operation. In the present example embodiment the security controller (and later the guest execution environment itself) first destructively claims any pages of the physical memory address space it wishes to use, from among those already allocated by the hypervisor as available for use by the guest execution environment as owned by the security controller and subsequently the guest execution environment.

The security controller receives the request forwarded from the hypervisor and destructively claims all pages into which it wishes to install the encrypted executed code. The security controller marks the process that is claiming and scrubbing into a state "scrub" as indicated in a process descriptor entry for the requested process while they are being claimed and scrubbed. The process is then marked as "preparing" as the executable code is installed. The security controller decrypts the executable code it has received using its private key. The decrypted code is stored into the claimed pages which are at this stage owned by the security controller. The pages storing the decrypted executable code are then marked as "executing" which indicates they are closed and ready to execute. The security controller then transfers ownership of the pages that it has claimed to the guest execution environment which is being initialized. A default, empty CPU execution context structure within the blind domain concerned is also initiated at this time. In this example embodiment, the security controller has preformed a secure initialisation by applying its private key to decrypt the executable code. In other example embodiments, the secure initialisation may additionally or alternatively include validation of the executable code and/or secure install attestation by the security controller.

At this stage, the security controller notifies the hypervisor that the guest execution environment is now ready to "execute". The state indicating that this is a "first" execution may be separately stored with a CPU context table entry for the process concerned.

The hypervisor performs the role of scheduling processes for execution. When the time has arrived for the newly initialized guest execution environment to be executed for the first time, then the hypervisor starts this execution. The guest execution environment then executes the decrypted executable code which was stored into the physical pages that have been transferred in ownership of the guest execution environment by the security controller. The code executing in the guest execution environment destructively claims any further pages it needs for its operation from among those pages marked as available to it by the hypervisor.

It will be appreciated that the guest execution environment may take a variety of different forms. In some embodiments, the guest execution environment may be a full operating system supporting multiple guest application programs. In other example embodiments the guest execution environment may be a single bare application executing using its own memory pages and without a separate operating system or other associated systems. The present techniques may be used in these and other circumstances. The guest execution environment operating under control of the hypervisor provides the ability for separate processes to execute in isolation from each other. Furthermore, the provision of the security controller and the mechanisms of the page ownership tables and the destructive claiming of the ownership of pages seeks to provide a system in which the data of a guest execution environment (of whatever form) may be protected from access by other guest execution environments and the hypervisor itself.

In this example embodiment the security controller takes the form of a separate processor. In other example embodiments the security controller could take the form of a trusted process running on the same processor (e.g. a trusted process running in secure mode on a processor supporting ARM Limited's TrustZone) or a trusted hypervisor depending upon the particular degree of security required/desired.

FIG. 11 is a flow diagram schematically illustrating a process of destructive page claiming. At step 700, processing waits until a request to take ownership of the page is received. When such a request is received, step 702 determines whether the normal memory management unit provides write permission for the page concerned to the requesting process. This memory management unit may be controlled by the hypervisor. If the memory management unit does not give write permission, then the request is rejected and processing returns to step 700. If the memory management unit does give write permission, then processing proceeds to step 704, where an overwrite counter is initiated. Step 706 waits until a line of the page for which ownership is requested is detected as having been overwritten. Step 708 determines whether this was the next expected line to be overwritten. It is assumed in this example embodiment that it is expected that the lines forming the page of memory are written in sequence. If the expected line was not overwritten, then the request to claim ownership again fails and processing returns to step 700. If the determination at step 708 is that the expected next line was overwritten, then processing proceeds to step 710 where the overwrite counter is incremented. Step 712 determines whether or not the full page has yet been overwritten as indicated by the overwrite counter reaching a predetermined value. If the overwrite counter has not yet reached the value indicating that the full page has been overwritten, then processing returns to step 706 where the system waits for the next line of the page to be overwritten. If the full page has been overwritten, then step 714 serves to mark the page as now owned by the requester in the page ownership table.

FIG. 12 schematically illustrates a hardware environment 800 for providing the systems described herein. In this example in the hardware environment 800 there are provided a plurality of processors 802, 804, a security controller 806, a physical main memory 808 and bus mastering device, such as a memory mapped input output device 810 all connected via an interconnect 812. It will be appreciated that the hardware environment 800 could take a wide variety of different forms. The present techniques are well suited for use, for example, in the context of cloud computing in which a tenant (cloud customer) has a processing task they wish to be performed. Rather than having their own processing hardware to perform the required task, they send the required task to be executed within a guest execution environment provided by a cloud services provider. The cloud services provider may receive the request for the guest execution environment with a hypervisor program and then initiate execution of that guest execution environment as previously discussed. The execution of the guest execution environment may itself be distributed across multiple processes, or even multiple sites, depending upon the type of cloud execution support being provided. The mechanisms described herein seek to provide an increased level of security between guest execution environments whereby guest execution environments may be protected from one another and may also be protected against the hypervisor itself.

The hardware execution environment 800 of FIG. 12 supports page ownership tables as described herein. The processors 802, 804 and the security controller 806 are each provided with ownership and overwrite tracking hardware (OTH) which serves to manage the process of obtaining ownership of a page of the physical memory address space and the overwriting of that page as part of the claiming process as described elsewhere herein. Also provided within at least the processor 802 and 804 which support context switching is context switching circuitry (CS) which serves to save context data to a context data memory 814 within the main memory 808 as part of a context switching process. The context switching circuitry is a form of exception handling circuitry. The regions forming the context data memory 814 in respect of each context will be owned by the associated process concerned, which can thereby control the access to that context data to ensure that it is kept private if this is desired.

FIG. 13 schematically illustrates a software layer model using the current techniques. This software layer model includes multiple levels of privilege extending from a security controller at a highest level down to a hypervisor and a guest execution environment, which may itself include a guest operating system and guest applications. A new guest execution environment is initialized at a privilege level lower than that of the hypervisor.

In one example embodiment, the privilege levels could extend from a lowest level corresponding to the guest application programs. The next higher level would be the guest operating systems followed by the hypervisor and then the monitor program or firmware executed by the security controller. A highest level of privilege can be associated with the security complex which manages the access to, distribution of and validation of the cryptographic keys used in the system. It will be appreciated that other privilege level models may be adopted.

A feature of the present techniques is that the page ownership mechanisms permit the system to operate such that a guest execution environment has control of access to pages which it owns whereas, for example, a hypervisor which has a higher level of privilege may be prevented by the guest execution environment from having access to those pages. This is contrary to normal expectations in which higher levels of privilege give more access rights and control over access rights. The ownership and overwrite tracking circuitry illustrated in FIG. 12 may serve to enforce ownership rights of memory regions within the physical memory address space in accordance with an access configuration controlled by the owning process for that page. The owning process (as indicated in the page ownership table) may mark the page ownership as private to the owning process, or shared between the owning process and one or more further sources of memory access requests. A page would normally be initialized into the private state following its destructive claiming. The sharing of access by the owning process may take a variety of different forms, as illustrated in FIG. 14. An owning process for a page may transfer ownership of that page to a "child" process which is initialized by the owning process (the "parent" process). When such a parent process has initialized a child process and the child process is still in the "prepare" state, then it can transfer ownership of one or more of the pages which the parent owns to that child process. The child process will initially receive those pages marked as private to that child process. The child process may then, if it so wishes, change the shared access control status for any of the pages it owns to indicate a shared status in which it is shared with its parent process. The child process destructively claims new pages allocated to it when it receives them from its parent process. Sharing can also be with an ancestor process, such as a grandparent process or any older process in an ancestor hierarchy.

When a process accesses a page it may, in some example embodiments, check that that shared access control data for that page is the same as the process is expecting. As an example, if a process owns a page and has set it up as having shared access control a "private", then it may check that the page is still configured in this way within the page ownership tables before it stores any sensitive data to that page.

Another form of sharing which may be selected by an owning process is to share a page with a memory mapped device in which the memory map device concerned is mapped into a page of memory which is owned by the process changing the access control. Accordingly, memory mapped devices sitting within memory address space owned by a process may be given the right to access that some page or another page of memory owned by that same process.

A further form of shared access which may be specified by an owning process is a globally shared status whereby a page of the physical address memory, is permitted to be accessed by any other process and is no longer owned by any individual process (in some example embodiments a unique BDID may be provided to be associated with all global pages). The owning process may ensure that sensitive data of that owning process is not written into that globally shared page.

FIG. 15 schematically illustrates how the ownership and overwrite tracking hardware serving as ownership circuitry serves to handle request for change of sharing permissions received from a process. At step 900 processing waits until a request to change sharing permissions is received. When such a request is received, then step 902 determines whether or not the request to change an access permission has been received from the process indicated in the page ownership table as owning the page concerned. If the request has been received from the owning process, then step 904 actions that requested change in access permissions (e.g. adopts one of the access control status options indicated in FIG. 14) and then processing returns to step 900. If the determination at step 902 is that the request is from a process which does not own the page concerned, then step 906 serves to ignore the requested change and optionally raise a warning that an incorrect and/or inappropriate request for change has been received before processing again returns to step 900.

As mentioned in connection with FIG. 10, the hypervisor may serve to schedule the execution of different execution environments. These different execution environments respectively own their own pages of the physical memory address space. When the hypervisor stops the processing of one guest execution environment and starts the processing of a different guest execution environment, then this is a switch of execution context and a switch of which process will be active. This context switching may be performed by protected exception handling. The state data of the processor, or wider system, at the time the change of context occurs may include many state parameters, e.g. register contents, configuration variables, program status values, etc. This state data is context data and may represent private information that it is desired not to allow to be available to other guest execution environments, or the hypervisor itself. FIGS. 16A and 16B are flow diagrams illustrating how execution context may be protected.

At step 1000 processing waits until a context switching interrupt is received such as involuntary exit to a different process. State 1002 saves restart data to a portion of a context data memory 814 owned by the process (guest execution environment) that is subject to the interruption. This restart data may, in some example embodiments, be state data sufficient to restart the interrupted process, but need not include all state data which is dependent upon the interrupted process. As an example, the restart data may include general purpose register contents, but need not include microarchitectural state such as cache contents, translation look aside buffer contents, and the like. Following the saving of the restart data into portions of the context data memory 814 owned by the process being interrupted at step 1002, step 1004 serves to destructively overwrite state data which is dependent upon the current process and that would be accessible to any other process following the switch to another process. The overwritten data may be superset of the restart data. The overwritten data may also exclude microarchitectural data, and other data which is not accessible to the newly started process, e.g. data within memory regions owned by the process which is being interrupted, but that will be inaccessible to a newly started process by virtue of the action of the page ownership tables and other mechanisms. The overwriting may, for example, set all of the accessible state dependent upon the current process to zero values or some other predetermined value which is not dependent upon the processing which was actually performed by the process which is being interrupted. The system then returns to step 1000 to await the next context switching interrupt. In the case of a voluntary exit from a process, e.g. a process call to a higher exception level, a subset of register contents, e.g. R0-R7, may be passed to the call target with other registers/state being stored and restored on exit and re-entry.

As shown in FIG. 16B, the system waits at step 1005 until there is a new process to be started. Step 1006 serves to determine whether or not the new process to be started is one for which the associated status is "ready" in the CPU context data. If the process is not in the ready state, then this indicates that it has already been scheduled for execution and executed at least once and accordingly will have its own context data which should be restored before its execution is re-started. If the process to be started is not in the "ready state", then step 108 serves to restore its restart data from the pages of memory which it owns within the context data memory 814. If the process to be started is in the "ready" state, e.g. is in the "ready for first execution" state, then step 1008 is bypassed. Finally, at step 1010 the execution of the new process is commenced before process is returned to step 1005 to await another new process.

FIG. 17 indicates a process descriptor entry which may be one of a plurality of process descriptor entries within a process descriptor table. The process descriptor entry includes, for example, the blind domain identifier (BDID). The page descriptor entry also includes pointer (handle) to a location within the context data memory 814 to which context data for the process concerned is to be saved (and from which it is restored) when the process concerned is switched out. This pointer indicates a region of memory which is owned by the process concerned. The page descriptor entry also includes a current process status as will be discussed further below.

FIG. 18 schematically illustrates example process status states for a process. A process that has ceased to be used is marked as invalid and its BDID will be available to be reclaimed by a new process. The hypervisor may be responsible for creating a process and setting up the process descriptor entry. The initialization of that process may be performed in conjunction with the security controller as previously described. The next state in sequence which may be adopted by the process is a "scrub" state. This indicates that the process BDID concerned has been claimed and associated pages for ownership by the process are undergoing scrubbing, e.g. existing entries in page ownership tables for earlier uses of the BDID concerned are removed and then new pages for the BDID are claimed and scrubbed (subject to destructive overwriting). When scrubbing has completed, then the process concerned is switched to a "prepare" state this indicates that the process concerned is open and ready to have its pages populated. When the population of the pages has completed the process is changed to an "executing" state which is closed and ready to execute. There is a ready for first execution state that is stored in a status field of a CPU execution context within the domain and used to control whether or not restart data is restored when execution of the process is started. FIG. 18 illustrates the "lifecycle" of a process including a plurality of process states through which the process is moved in sequence following its preparation for execution. The number and particular form of these states may vary.

At least some example embodiments include a blind domain execution context (or frame) BDEC that may be used to store state data of a process when switching that process into and out of execution. Included within this state data is an indication of whether or not the process concern has already undergone some execution. If the process has not been executed already, then it is marked in this example as "new" (see "ready" state previously discussed). The execution context data may also include state data such as the general purpose register contents at the time the process was exited. These register contents may be restored when the process is re-entered. There are status parameters that further specify whether a process was exited voluntarily (e.g. following a software function call) or involuntarily (e.g. following a hardware interrupt); this information may be used to control how the process is re-started as well as the actions preformed as the process is exited. The context data may be stored so as to be private to the process concerned.

Each BDEC may contain an indication of state such as: New, Voluntary_Exit, Involuntary_Exit, Voluntary_Complete, Involuntary_Complete and Invalid. The BDEC may also include an indication of the exception level that owns the domain, the contents of the general purpose registers for the domain (e.g. R0-R30, PC, P-State, etc) and the content of the exception level registers for the domain (e.g. TTBR_ELx, etc).

In general an ownership table may be provided comprising one or more entries each indicating, for a corresponding block of physical addresses, which of a plurality of processes is an owner process that has exclusive control of access to the corresponding block of physical addresses. This can be useful to allow any one of a plurality of processes to take exclusive control over a given region of the physical address space in order to restrict access to that region by other processes. This is particularly useful as it can allow a process at a lower privilege level to control or restrict access to data by a more privileged process, which is not possible in typical systems.

In general, there may be some means for a requesting process to request ownership of a target block of physical addresses. The target block of physical addresses could be identified directly in the request, or indirectly by specifying a virtual address or intermediate address or in some other manner. The ownership request could be a dedicated ownership request instruction (such as the claim start instruction discussed above), or another kind of instruction with a parameter indicating that ownership is requested for a given page, or the request could correspond to another kind of ownership request command (not necessarily an instruction), e.g. by setting some control information which triggers some other process to initiate the ownership request, for example. In response to the ownership request, processing circuitry can update the ownership table to indicate that the requesting process is now the owner for the target page. Hence, a requesting process can protect sensitive data by requesting ownership of the corresponding blocks of addresses before writing the sensitive data to memory, for example.

When ownership of a given block of addresses changes from one process to another, a number of techniques could be used to prevent leakage of sensitive information from the old owner to the new owner. As discussed in the examples above, one way is to require successful completion of an overwriting procedure to overwrite each address in the target block before the process requesting ownership can validly become the owner process for that block. This could be enforced either by hardware which actually performs the overwriting procedure, or with the requesting process itself or another trusted process carrying out the overwriting procedure but hardware checking whether it has successfully been completed. One way for hardware to check whether the overwriting procedure has successfully completed may be to check that the physical addresses overwritten in one or more write operations performed between an ownership claim start command and an ownership claim end command include every physical address of the target block. If the writes performed between the ownership claim start and end commands do not contiguously cover the entire block of addresses, then the overwriting procedure may fail and the requester cannot validly become the owner. For example, these checks could be performed using a claim count value tracking the number of completed writes and their address offsets as discussed above. It will be appreciated that there may be other techniques for determining that the overwriting procedure has successfully overwritten the data at each physical address of the target block.

Some embodiments may provide encryption circuitry to encrypt data written to memory and decrypt data read from memory. Each process may have one or more associated keys and data written to a particular block of addresses may be encrypted using a key associated with the owner of that block, and decrypted on reading the data back from the memory. In systems comprising encryption, the overwriting procedure may not be necessary since even if the data associated with one process remains in memory following transfer of a block of addresses to another owner, the new owner would not be able to read the data since it is encrypted using the key of the old owner.

Nevertheless, for increased security, even if there is encryption capability, it may be preferred to also require that the overwriting procedure is performed for a block of addresses when ownership of that block is transferred. Combining both encryption and the overwriting procedure also has the benefit that the owner process can vary the level of encryption required for each of the blocks of addresses it owns without risking data being lost when ownership of a block is transferred. The different encryption modes may comprise different levels or strengths of encryption, for example.

In general, ownership protection circuitry may be provided to reject access requests from a current process to access data at a target physical address when a corresponding entry of the ownership table indicates that the current process is not permitted by the owner process to access that address. For example, the ownership protection circuitry may comprise the BDMU described above, or alternatively could be some circuitry provided within a memory controller. By rejecting requests which do not satisfy the owner's permissions, the owner process can have exclusive control over access to the owned block of addresses.

In addition to ownership protection circuitry, there may also be access control circuitry which enforces access permissions set by particular processes, such as a hypervisor, virtual machine or operating system. For example the access control circuitry could correspond to an MMU as discussed above. Whereas the access control circuitry enforces permissions set by particular processes at particular privilege levels (e.g. to allow the hypervisor to partition the address space between different virtual machines for example), the ownership protection circuitry can allow any process to enforce permissions on other processes regardless of their privilege level, by requesting ownership of the pages for which those permissions is required.

The technique can be particularly useful for systems supporting two or more of a hypervisor, one or more virtual machines, one or more guest operating systems and one or more applications. However, more generally the technique could be applied to any system in which multiple processes co-exist and one process may prevent another process accessing data.

As discussed above, the POT 50 may include the address field 58 which effectively represents a "reverse translation mapping" from the PA associated with the POT entry 52 to a VA or IPA from which the PA was translated at some reference point in time.

However, a similar technique could also be applied more generally to any table indexed by physical address, for which at least one entry may identify a first address from which the corresponding physical address was translated by address translation circuitry. By retaining a snapshot of a reverse mapping from a physical address to a first address from which the physical address was translated, it is possible to later check whether the mapping is still the same, which can be useful for detecting subsequent changes in the address mapping which might affect the validity of the contents of the table.

In general, processing circuitry may be responsive to the occurrence of a reference event to record, in the entry of the table corresponding to a given physical address, the first address currently translated into the given physical address by the address translation circuitry. The reference event could for example be the allocation of a new entry into the table for the given physical address, the updating of information in an existing entry of the table for the given physical address, the execution of a predetermined type of instruction (e.g. an instruction specifying the given first address) or a predetermined change of operating mode of the data processing apparatus (e.g. a change to a secure mode). Hence, the first address recorded in the table may represent the mapping between the first address and the corresponding physical address which existed at the time of the reference event.

Later, when an access request is received which specifies a target first address to be translated into a target physical address by the address translation circuitry, control circuitry can determine whether there is a mismatch between the target first address and the first address specified by the entry of the table corresponding to the target physical address. For example, this effectively determines whether the address mapping is still the same as the time of the reference event which led to the first address being stored to the table. If there is a mismatch between these addresses, the request can be rejected or an error can be signalled.

In some cases, the physically indexed table may be provided solely for the purpose of tracking past address mappings and detecting whether they are still the same at a later time, so it is not necessary for the physically indexed table to contain any information besides the first address itself.

While this technique can be used for any physically indexed table, it is particularly useful for the ownership table of the form discussed above which indicates owners for corresponding blocks of physical addresses and where the owner has exclusive control of access to those addresses. Recording a reverse physical-to-first address mapping in the table can help to prevent attacks of the type discussed above where a change of address mapping could lead to loss of sensitive information.

In some cases, the first address may be a virtual address. In other cases the first address may be an intermediate physical address. Also, it is possible for one table to have some entries where the first address is a virtual address and other entries where the first address is an intermediate address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A data processing apparatus comprising:
processing circuitry to execute a plurality of processes;
address translation circuitry to translate a first address into a physical address directly identifying a corresponding location in a data store; and
a table comprising one or more entries indexed by the physical address, wherein at least one of said entries identifies a first address from which the corresponding physical address was translated by the address translation circuitry; and
control circuitry to determine whether, in response to an access request specifying a target first address to be translated into a target physical address by the address translation circuitry, there is a mismatch between the target first address and the first address specified by the entry of the table corresponding to the target physical address, and to reject the access request or signal an error when said mismatch is determined;

wherein the table comprises an ownership table for which the one or more entries each indicate, for a corresponding block of physical addresses, which of said plurality of processes is an owner process that has control of access to the corresponding block of physical addresses;

wherein each entry of the ownership table comprises at least one attribute set by the owner process for controlling access to the corresponding block of target addresses; and said at least one attribute specifies one or more of:
whether other processes than the owner process are allowed to access the corresponding block of physical addresses;
whether said other processes are allowed to read or write to the corresponding block of physical addresses; and
a level of encryption to be applied for data stored to the corresponding block of physical addresses.

2. The apparatus according to claim 1, comprising processing circuitry responsive to a reference event to record, in the entry of the table corresponding to a given physical address, the first address currently translated into the given physical address by the address translation circuitry.

3. The apparatus according to claim 2, wherein the reference event comprises allocation of an entry to the table for the given physical address.

4. The apparatus according to claim 2, wherein the reference event comprises an update to at least some information in the entry of the table for the given physical address.

5. The apparatus according to claim 2, wherein the reference event comprises execution of a predetermined type of instruction.

6. The apparatus according to claim 2, wherein the reference event comprises a predetermined change of operating mode of the data processing apparatus.

7. The apparatus according to claim 1, wherein each entry identifies at least one attribute; and
the apparatus comprises control circuitry to determine whether, in response to an access request specifying a target first address to be translated into a target physical address by the address translation circuitry, there is a mismatch between an expected attribute for the access request and one of said at least one attribute specified by the entry of the table corresponding to the target physical address.

8. The apparatus according to claim 7, wherein said expected attribute is dependent on information specified in a page table entry used to translate the target first address into the target physical address.

9. The apparatus according to claim 1, wherein the first address comprises a virtual address.

10. The apparatus according to claim 1, wherein the first address comprises an intermediate address, and the apparatus comprises further address translation circuitry to translate a virtual address into the intermediate address.

11. The apparatus according to claim 1, comprising control circuitry to reject an access request specifying a target first address to be translated into a target physical address by the address translation circuitry when an entry of the ownership table corresponding to the target physical address indicates that the process which triggered the access request is not permitted by the owner process to access the target physical address.

12. The apparatus according to claim 11, wherein the control circuitry is also configured to reject the access request when the access request is triggered by the owner process and there is a mismatch between the target first address and the first address specified in the entry of the ownership table corresponding to the target physical address.

13. The apparatus according to claim 1, wherein the plurality of processes include processes of a plurality of different privilege levels; and
for at least one block of physical addresses for which a process having a lower privilege level is the owner process, a corresponding entry of the ownership table specifies whether a process having a higher privilege level is allowed to access that block of target addresses.

14. The apparatus according to claim 1, wherein the address translation circuitry comprises first address translation circuitry to translate a virtual address into an intermediate address and second address translation circuitry to translate the intermediate address into the physical address;
for entries of the ownership table specifying an owner process of a first type, the first address comprises the virtual address; and
for entries of the ownership table specifying an owner process of a second type, the first address comprises the intermediate address.

15. The apparatus according to claim 1, wherein the address translation circuitry is configured to translate the first address into the physical address based on address mapping data set under control of a predetermined process of said plurality of processes.

16. A data processing apparatus comprising:
processing circuitry to execute a plurality of processes;
address translation circuitry to translate a first address into a physical address directly identifying a corresponding location in a data store; and
a table comprising one or more entries indexed by the physical address, wherein at least one of said entries identifies a first address from which the corresponding physical address was translated by the address translation circuitry; and
control circuitry to determine whether, in response to an access request specifying a target first address to be translated into a target physical address by the address translation circuitry, there is a mismatch between the target first address and the first address specified by the entry of the table corresponding to the target physical address, and to reject the access request or signal an error when said mismatch is determined;
wherein the table comprises an ownership table for which the one or more entries each indicate, for a corresponding block of physical addresses, which of said plurality of processes is an owner process that has control of access to the corresponding block of physical addresses, and
in response to an ownership request requesting that a requesting process of said plurality of processes becomes the owner process for a target block of physical addresses corresponding to a target first address, the address translation circuitry is configured to translate the target first address into a target physical address, and the processing circuitry is configured to update the ownership table to indicate that the requesting process is the owner process for the target block of physical addresses.

17. The apparatus according to claim 16, wherein in response to the ownership request, the processing circuitry is configured to write the target first address to an entry of the ownership table corresponding to the target physical address.

18. A data processing method comprising:
- in response to an access request specifying a target first address, translating the target first address into a target physical address directly identifying a corresponding location in a data store;
- accessing a table comprising one or more entries each corresponding to a physical address and identifying a first address from which the corresponding physical address was translated by the address translation circuitry;
- determining whether there is a mismatch between the target first address specified by the access request and the first address specified in the entry of the table corresponding to the target physical address; and
- rejecting the access request or signalling an error when said mismatch is determined;
- wherein the table comprises an ownership table for which the one or more entries each indicate, for a corresponding block of physical addresses, which of a plurality of processes executed by processing circuitry is an owner process that has control of access to the corresponding block of physical addresses;
- wherein each entry of the ownership table comprises at least one attribute set by the owner process for controlling access to the corresponding block of target addresses; and
- said at least one attribute specifies one or more of:
  - whether other processes than the owner process are allowed to access the corresponding block of physical addresses;
  - whether said other processes are allowed to read or write to the corresponding block of physical addresses; and
  - a level of encryption to be applied for data stored to the corresponding block of physical addresses.

* * * * *